United States Patent
Ohta et al.

(10) Patent No.: US 7,755,780 B2
(45) Date of Patent: Jul. 13, 2010

(54) INFORMATION PROCESSING APPARATUS, SERVER APPARATUS, PRINTING CONTROL SYSTEM, PROGRAM AND STORAGE MEDIUM

(75) Inventors: Atsushi Ohta, Nara (JP); Fusahiro Shiono, Habikino (JP)

(73) Assignee: Sharp Kabushiki Kaisha, Osaka (JP)

( * ) Notice: Subject to any disclaimer, the term of this patent is extended or adjusted under 35 U.S.C. 154(b) by 788 days.

(21) Appl. No.: 11/556,241

(22) Filed: Nov. 3, 2006

(65) Prior Publication Data

US 2007/0109593 A1 May 17, 2007

(30) Foreign Application Priority Data

Nov. 14, 2005 (JP) .............................. 2005-329169

(51) Int. Cl.
*H04N 1/40* (2006.01)
(52) U.S. Cl. ...................................... 358/1.13; 358/468
(58) Field of Classification Search .................. 358/1.9, 358/2.1, 1.13, 1.15–1.16, 436, 468
See application file for complete search history.

(56) References Cited

U.S. PATENT DOCUMENTS 6,757,070 B1 * 6/2004 Lin et al. ...................... 358/1.1

2002/0080376 A1 6/2002 Momose et al.

FOREIGN PATENT DOCUMENTS

| JP | 2001-005628 | 1/2001 |
|---|---|---|
| JP | 2002-073314 | 3/2002 |
| JP | 2002-182871 | 6/2002 |
| JP | 2003-303038 | 10/2003 |
| JP | 2004-220487 | 8/2004 |
| JP | 2004-272390 | 9/2004 |
| JP | 2005-031784 | 2/2005 |
| JP | 2005-301748 | 10/2005 |

* cited by examiner

*Primary Examiner*—Thomas D Lee
*Assistant Examiner*—Stephen M Brinich
(74) *Attorney, Agent, or Firm*—Renner, Otto, Boisselle & Sklar, LLP

(57) ABSTRACT

A personal computer is an information processing apparatus including: a browser which obtains data from a resource and displays an image corresponding to the data; and a printer driver section for carrying out control of printing operation. The printer driver section includes an UI processing section for instructing the browser to obtain setting image data from a content item storage section which stores the setting image data which corresponds to a setting image by which a user sets printing conditions, and to display the setting image expressed by the setting image data in a display apparatus. In this way, the present invention realizes an information processing apparatus capable of easy modification of the setting image for setting printing conditions.

20 Claims, 15 Drawing Sheets

FIG. 2

| SINGLE/DOUBLE SIDED / PAPER SIZE | SINGLE-SIDED | DOUBLE-SIDED (VERTICAL BINDING) | DOUBLE-SIDED (HORIZONTAL BINDING) | MIDPOINT BINDING | 2-up |
|---|---|---|---|---|---|
| A3 | Y | Y | Y |  | Y |
| A4 | Y | Y | Y | Y | Y |
| A5 | Y | Y | Y | Y |  |
| B4 | Y | Y | Y |  | Y |
| B5 | Y | Y | Y | Y |  |
| LEDGER | Y | Y | Y |  | Y |
| LETTER | Y | Y | Y | Y | Y |
| LEGAL | Y | Y | Y |  |  |
| EXECUTIVE | Y | Y | Y |  |  |
| INVOICE | Y | Y | Y | Y |  |
| FOOLSCAP | Y | Y | Y |  |  |
| 8K | Y | Y | Y |  | Y |
| 16K | Y | Y | Y | Y |  |
| DL | Y |  |  |  |  |
| C5 | Y |  |  |  |  |
| COM10 | Y |  |  |  |  |
| Monarch | Y |  |  |  |  |
| ENVELOP No. 3 | Y |  |  |  |  |
| CUSTOM PAPER | Y |  |  |  |  |

INFORMATION PROCESSING APPARATUS, SERVER APPARATUS, PRINTING CONTROL SYSTEM, PROGRAM AND STORAGE MEDIUM

This Nonprovisional application claims priority under 35 U.S.C. §119(a) on patent application No. 2005/329169 filed in Japan on Nov. 14, 2005, the entire contents of which are hereby incorporated by reference.

FIELD OF THE INVENTION

The present invention relates to an information processing apparatus which includes browsing means for obtaining data from a resource and causing a display apparatus to display an image corresponding to the data; and printing control means for controlling printing operation. The present invention also relates to a server apparatus capable of communication with the information processing apparatus, a printing control system, and a printing control program (printer driver).

BACKGROUND OF THE INVENTION

One of the conventional printer drivers has a function of causing the display apparatus to display an image for setting printing conditions. This allows the user to input information through this image so as to set various conditions in carrying out printing with a printer.

The functions of the printer are now becoming more various and complicated, and therefore the printing operation is also becoming diversified. The setting screen needs to have detailed information to cope with such complication in printing job. Japanese Laid-Open Patent Application Tokukai 2001-5628 (published on Jan. 12, 2001) discloses a printer driver which displays animation in the setting screen, which allows more minute control in the printing operation. Also, Japanese Laid-Open Patent Application Tokukai 2002-182871 (published on Jun. 28, 2002), and Japanese Laid-Open Patent Application Tokukai 2004-220487 (published on Aug. 5, 2004) disclose a printer driver capable of displaying icons corresponding to printing functions by which the user can more easily understand the details of the printing functions.

After such a setting image is created, the designer may desire to make some changes in design often to improve user's operation efficiency. The users also may desire to customize the setting image according to their own needs.

However, in the foregoing conventional printer drivers, all programs for creating and displaying the setting image are mounted to the printer driver in advance. Therefore, it is necessary to edit the whole built-in program of the printer driver to make changes of the setting image. This is extremely troublesome. Particularly, the printer driver for driving the setting image with animation or icons is very large, and the changes for the setting image becomes further difficult.

SUMMARY OF THE INVENTION

An object of the present invention is to provide an information processing apparatus which allows easy modification of the image for setting the printing conditions. The present invention also relates to a server apparatus, a printing control system, a printing control program, and a storage medium related to this function.

The information processing apparatus according to the present invention comprises browser section for obtaining data from a resource and displaying an image expressed by the data in a display apparatus; and printing control section for controlling a printing operation, the printing control section including instructing section for instructing the browsing section to obtain setting image data from a storage section which stores the setting image data which corresponds to a setting image for setting printing conditions and to display the setting image expressed by the setting image data in the display apparatus.

The printing control section designates a functional block realized by carrying out certain processes specified by a printer driver program (hereinafter referred simply as a printer driver) with some kind of calculating means such as a CPU.

The "resource" designates a hardware resource in the information processing apparatus or a resource on a communication network.

With the foregoing arrangement, the printing control section includes instructing section for obtaining setting image data for a setting image, which allows the user to input printing condition, from a storage section, and instructing a display apparatus to display a setting image based on the obtained setting image data. With this structure, the printing control section only instructs the external browser to carry out display of a setting image based on the setting image data stored in the storage section.

Accordingly, the printer driver only requires a program for specifying the processes performed by the instructing section. That is, the printing control section does not require a program for carrying out display of the setting image. Therefore, the setting image may be modified without editing the whole printer driver. This allows easy modification of setting image.

The browser section, which causes the display apparatus to display the setting image under instruction by the instruction section, is set according to the type of setting image. For example, if the setting image is constituted only of still pictures, the instruction from the instruction section is given to a browser section which operates in accordance with software capable of displaying a still picture. If the setting image is constituted of still pictures and moving pictures, the instruction from the instruction section is given to a browser which operates in accordance with software capable of displaying a still picture and to a browser which operates in accordance with software capable of displaying a moving picture (it may otherwise be given to a browser which operates in accordance with software capable of displaying a still picture and a moving picture). By thus using an appropriate browser, it is possible to display setting images of various formats.

Further, the display function owned by the browser section can be used by the browser section, and also by the printing control section. In many cases, the browser section is originally equipped with many functions regarding image-display. Accordingly, it is not necessary to structure the whole information processing apparatus. For example, in the case of structuring the apparatus in the form of a program, the programming work can be omitted. In the case of structuring the apparatus in the form of a circuit, the circuit designing can be omitted.

Further, the setting image is displayed by the browser section based on the setting image data. Therefore, the setting image may be modified by editing the setting image data stored in storage section. That is, it is not necessary to modify the whole browser section. On this account, the setting image may be modified even more easily.

Further, an editing section is provided most of the cases which performs editing of data to be displayed by the browser. Through the editing section, the user can easily edit the setting image data. For example, if the browser section is a functional block realized by executing Web browser software by a calculation section such as a CPU, the data created with a format compatible with the Web browser can be easily edited (customized) by using common web-page creation software.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 2 is a drawing showing an example of a printing function restriction table stored in a printing function restriction table storing section provided in the personal computer.

DESCRIPTION OF THE EMBODIMENTS

First Embodiment

One embodiment of the present invention is described below with reference to FIGS. 1 through 8. The printing control system according to the present invention displays a setting image, with which the user sets printing conditions, by using existing browser software provided outside the printer driver.

In the present embodiment, the printing control system is provided in a single personal computer.

Figure 1:
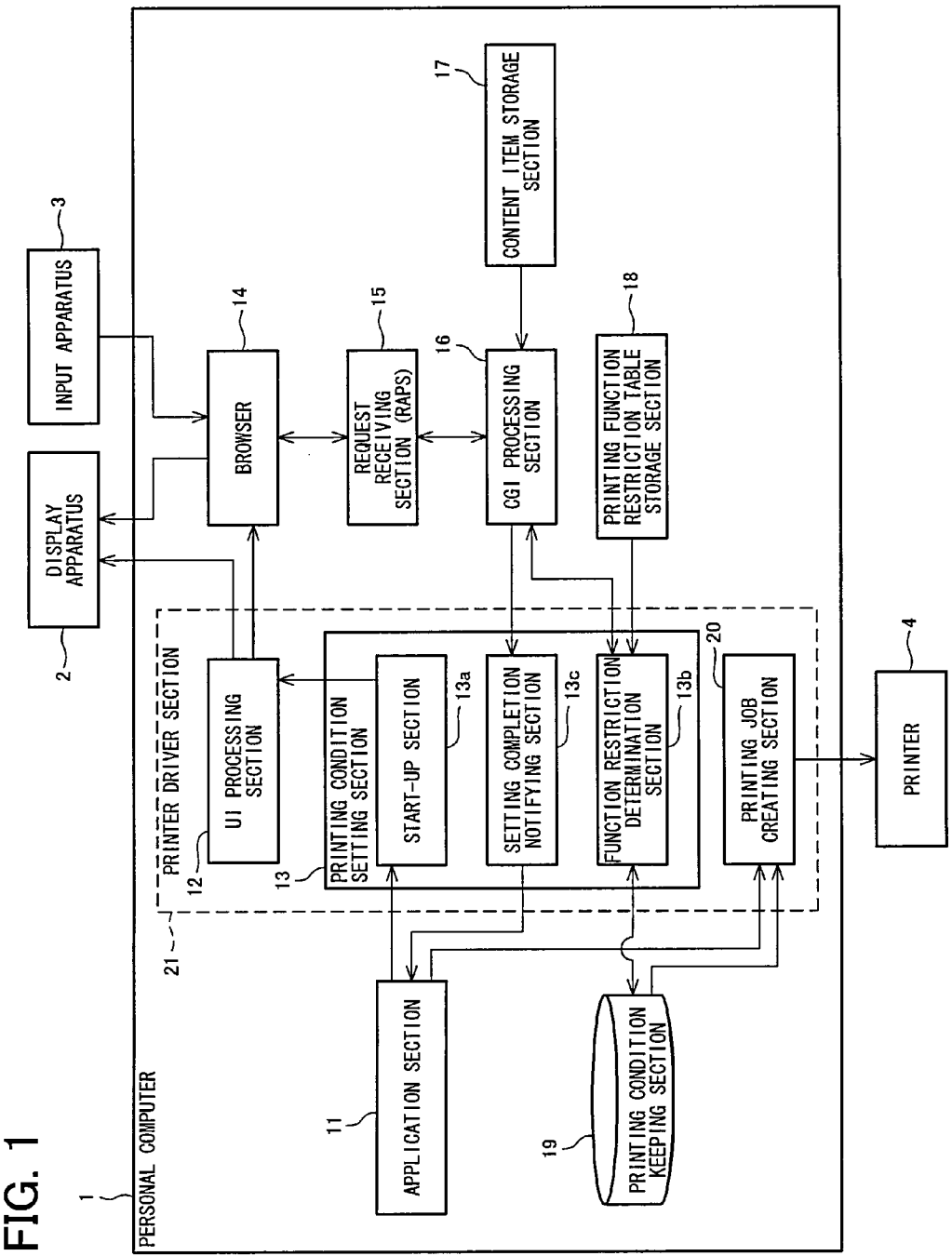
FIG. 1 is a block diagram showing a structure of a personal computer and a structure of its periphery devices according to the first embodiment of the present invention.

FIG. 1 is a block diagram showing a structure of a personal computer 1 and a structure of its periphery devices, according to the present embodiment. As shown in FIG. 1, the personal computer (information processing apparatus) 1 is connected to a display apparatus 2 such as a liquid crystal display; an input apparatus 3 such as a keyboard or a mouse; and a printer 4.

In accordance with instructions given by the user, the personal computer 1 creates an image file, and sets various conditions for printing operation of the image file, which is performed by the printer 4. Further, according to the determined printing conditions, the personal computer 1 converts the image file into printing data of a format recognizable by the printer 4, and also creates instructions given to the printer. The personal computer 1 then outputs a printing job, which includes the printing data and the instructions, to the printer 4. The printing conditions are determined by setting details of each of the plural printing functions.

The plural printing functions include selection of sheet size, number of printings, single or double sided printing, and 180° rotation. Each printing function has detailed sub-factors. For example, in the function of selecting sheet size, the factors may be "A4", "A3", "postcard" and the like. Similarly, in the function of selecting single or double sided printing, the factors may be "one-side", "double-sided (vertical-binding)", "double-sided (horizontal-binding)" or "midpoint-binding. For a special printing function, the detailed factors include activation/deactivation of the function. More specifically, the detailed factors of the "180° rotation" include "activate" and "deactivate".

(Internal Structure of Personal Computer)

The personal computer 1 includes an application section 11, an UI (user interface) processing section (instructing means) 12, a printing condition setting section 13, a browser (browsing means) 14, a request receiving section (RAPS: Resource Access Protocol Server) 15, a CGI (Common Gateway Interface) processing section 16, a content item storage section (storage section) 17, a printing function restriction table storage section 18, a printing condition keeping section 19, and a printing job creating section (printing job creating means) 20. The printing condition setting section 13 includes a start-up section 13a, a function restriction determination section (determining means) 13b and a setting completion notifying section 13c.

In the present embodiment, the UI processing section 12, the printing condition setting section 13 and the printing job creating section 20 constitute a printer driver section (printing control means) 21.

The application section 11 is an application for creating an image file which expresses an image to be formed by the printer 4. The application section 11 outputs a startup instruction to the start-up section 13a of the printing condition setting section 13 in response to a setting-start instruction, which is an instruction given by the user for setting conditions in printing performed by the printer 4. After receiving the notification of completion of setting of printing conditions, the application section 11 outputs the created image file to the printing job creating section 20.

The start-up section 13a of the printing condition setting section 13 serves to start up the UI processing section 12 in response to the startup instruction given by the application section 11.

The UI processing section 12 serves to carry out display of a setting image with which the user sets various printing conditions (detailed factors of the respective printing functions). However, the UI processing section 12 displays only an window for the setting image, and operates the browser 14 provided outside the printer driver section 21 so that the browser 14 displays the setting image in the window. The UI processing section 12 specifies a URL (Uniform Resource Locator) corresponding to the data (later-described setting image data) stored in the content item storage section 17, thereby starting the browser 14.

The content item storage section 17 keeps the setting image data corresponding to the setting image with which the user sets various conditions for the printing operation performed by the printer 4. The setting image data is constituted of data (eg. data written in HTML (Hypertext Markup Language) format) that the user can browse through the browser 14, moving picture data created by moving data software such as "Flash", and the like. Note that, the setting image data is not limited to an image containing a moving picture. The setting image data may be an image containing only still pictures.

The browser 14 is a functional block realized by any existing software for browsing HTML data and the moving picture data. For example, the browser 14 may be realized by carrying out certain processes specified by web-browser software by calculating means such as a CPU. In the present embodiment, the browser 14 carries out certain processes in accordance with Web browser software for browsing data written in HTML format (eg. Internet Explorer provided by Microsoft) and plug-in software for displaying a moving picture by using the Web browser (such as a Flash Player).

In recent years, most of common-use information processing apparatus such as a personal computer is equipped with such a browser 14.

The browser 14 requests the request receiving section 15 to transmit setting image data corresponding to the URL specified by the UI processing section 12. Further, the browser 14 displays the setting image corresponding to the received setting image data in the setting-image-window displayed by the UI processing section 12.

Here, if the user inputs instruction through the setting image, the browser 14 carries out the operation of the inputted instruction in accordance with the program of the setting image data.

For example, if the user clicks an icon of one of the printing functions, the browser 14 displays a dialog box through which the user inputs detailed conditions of the printing function, based on the script information contained in the data of the icon.

Further, when any change in detailed condition of the printing function is inputted to the input apparatus 3, the browser 14 creates modification information of XML format containing identification information (eg. name of the function) of the printing function and the input detailed condition. The browser 14 then transmits the information to the request receiving section 15.

Further, when instruction for completion of setting is inputted to the input apparatus 3, the browser 14 creates setting completion information indicating the completion of condition setting. The browser 14 then transmits the information to the request receiving section 15.

The request receiving section 15 receives the request from the browser 14, and causes the CGI processing section 16 to carry out a predetermined operation corresponding to the request. The request receiving section 15 also has a function of outputting the result of operation carried out by the CGI processing section 16 to the browser 14.

The CGI processing section 16 serves to carry out operation corresponding to the request from the browser 14.

More specifically, on receiving the request of data specified by an URL from the browser 14, the request receiving section 15 starts up the CGI processing section 16. Then the CGI processing section 16 obtains data from the URL address, and outputs the data to the request receiving section 15. The request receiving section 15 sends back the data came from the CGI processing section 16 to the browser 14.

Further, the request receiving section 15 starts up the CGI processing section 16 also in response to receipt of the modification information. Then the CGI processing section 16 transmits a request for determination, which contains the name of the printing function and the detailed conditions indicated by the modification information, to the function restriction determination section 13b of the printing condition setting section 13, so as to demand determination as to whether the printing function of the detailed conditions and the conditions set in advance are compatible with each other. After that, the CGI processing section 16 creates determination result information of XML format which indicates the result of determination by the printing condition setting section 13. The request receiving section 15 transmits the determination result information to the browser 14.

Receiving the determination result information from the browser 14, the request receiving section 15 starts up the CGI processing section 16. Then, the CGI processing section 16 notifies the start-up section 13a of condition setting.

The printing condition keeping section 19 serves to store the detailed conditions of the respective printing functions. At the time of start-up, the printing condition keeping section 19 has the default detailed conditions of the respective printing functions. The detailed conditions stored in the printing condition keeping section 19 are updated by the function restriction determination section 13b.

The printing function restriction table storage section 18 stores a table showing a list of incompatible combinations of the detailed conditions.

FIG. 2 is a drawing showing an example of a table showing incompatible combinations between the detailed conditions of "sheet size selecting function" and those of "single or double-sided printing setting function". FIG. 2 denotes that a combination of detailed conditions indicated by "Y" is acceptable, and a combination with a blank box is not acceptable.

When receiving the determination request from the CGI processing section 16, the function restriction determination section 13b of the printing condition setting section 13 reads out, from the printing function restriction table storage section 18, all printing function restriction tables related to the name of printing function contained in the determination request. The function restriction determination section 13b then determines whether there is any printing function with detailed conditions incompatible with the detailed conditions of the printing function contained in the determination request, with reference to the printing function restriction tables read out from the printing function restriction table storage section 18 and the detailed conditions of printing function kept in the printing condition keeping section 19. The function restriction determination section 13b notifies the CGI processing section 16 of the determination result.

If all of the detailed conditions are found to be compatible, the function restriction determination section 13b updates concerned data (data of the printing function contained in the determination request) in the printing condition keeping section 19 to the detailed conditions contained in the determination request.

When receiving the setting completion notification from the CGI processing section 16, the setting completion notifying section 13c of the printing condition setting section 13 causes the UI processing section 12 to stop displaying the setting image, and also transmits a notification of completion of setting to the application section 11.

The printing job creating section 20 serves to create a printing job based on the image file received from the application section 11 and the printing conditions kept in the printing condition keeping section 19. The printing job creating section 20 then transmits the created printing job to the printer 4.

(Flow of the Entire Operation for Setting Printing Conditions)

Figure 3:
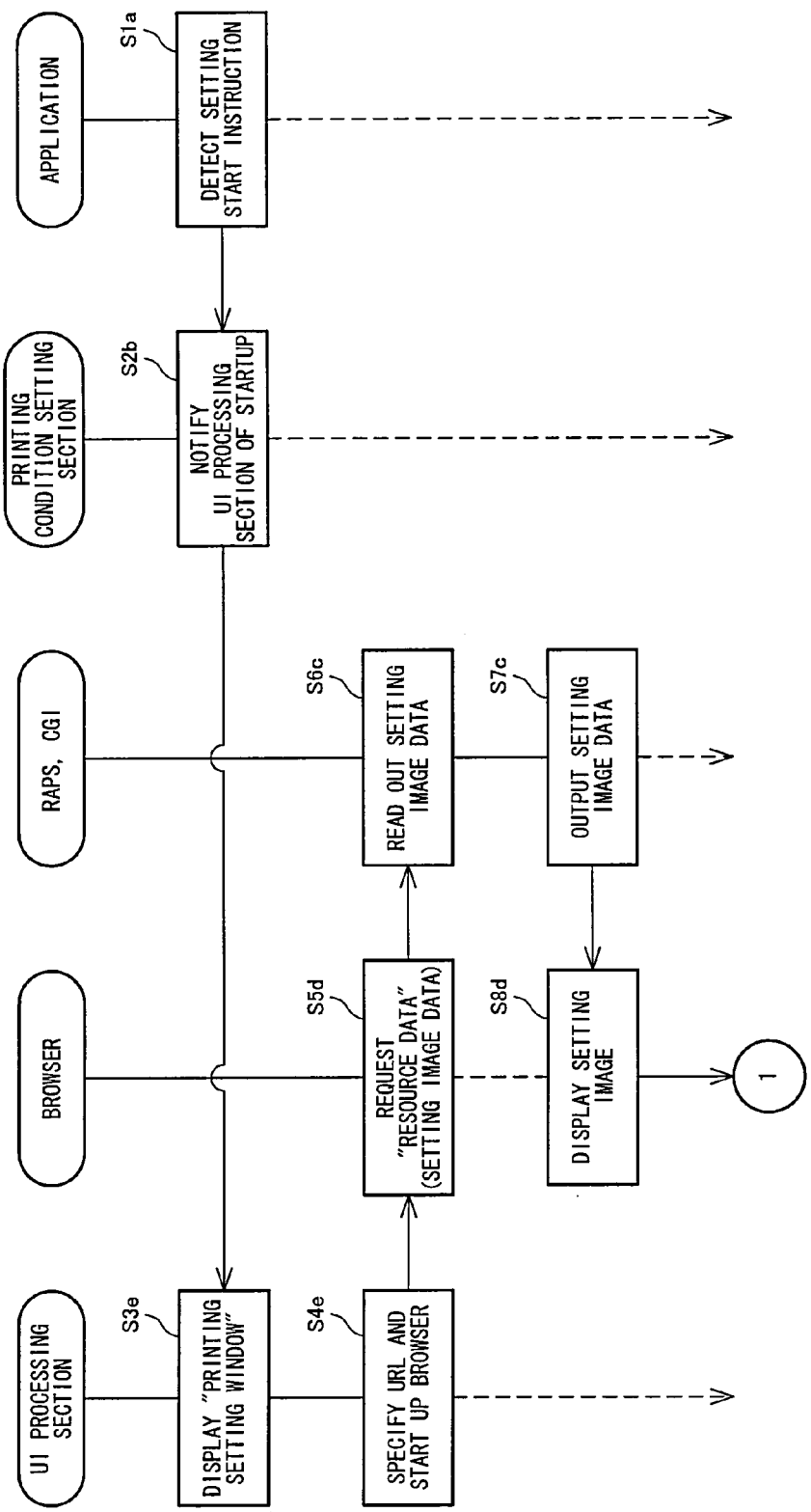
FIG. 3 is a flow chart showing a flow of display operation of a printing setting image among a series of operation for setting printing conditions.
Figure 4:
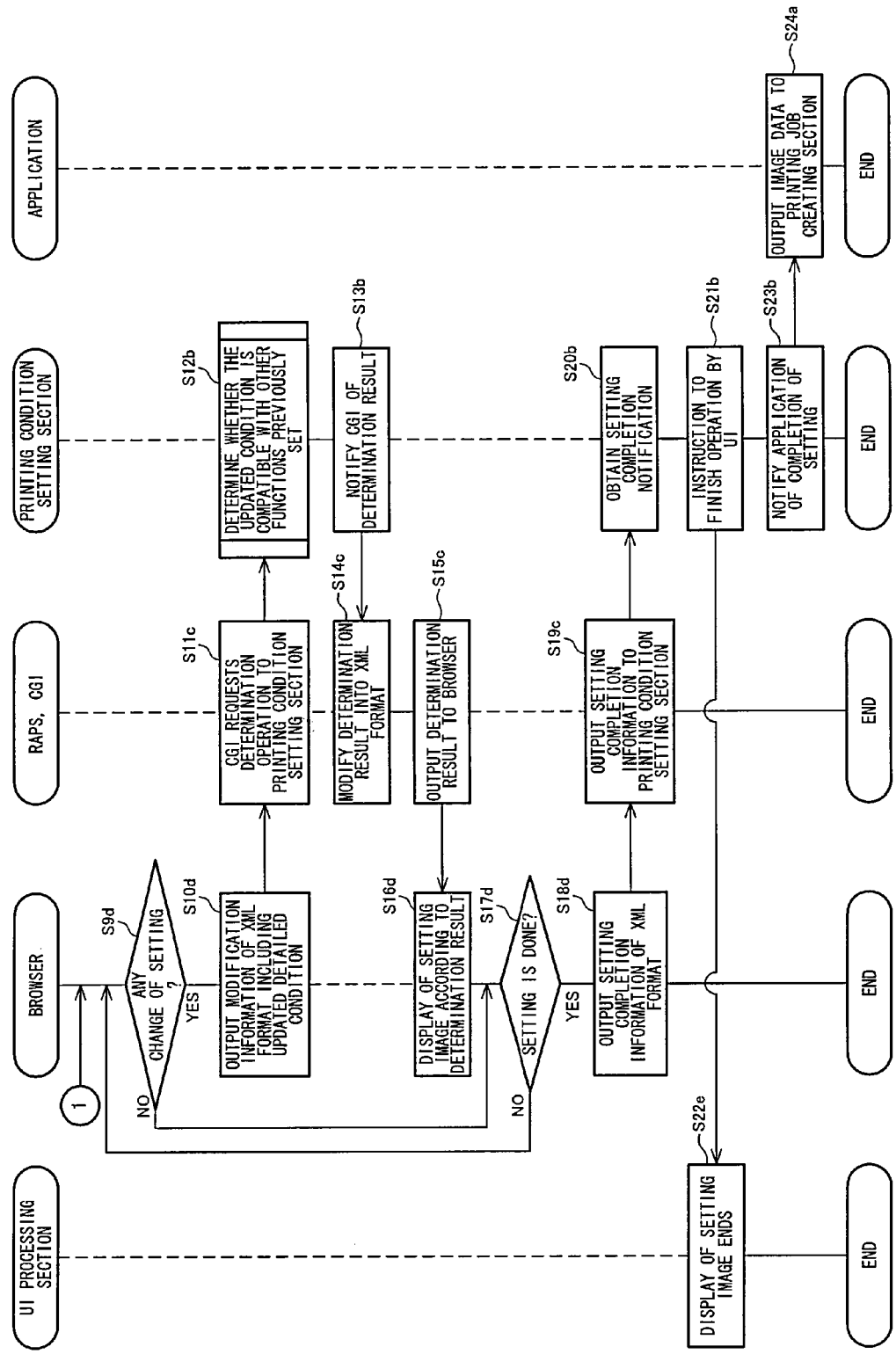
FIG. 4 is a flow chart showing an operation flow after the printing setting image appears, among a series of operation for setting printing conditions.

The following explains a flow of the entire operation for setting printing conditions, with reference to the flow charts of FIGS. 3 and 4.

First, the application section 11 detects input of instruction for starting setting of printing conditions (eg. by sensing pressing of button for setting printing condition). The application section 11 then outputs a start-up instruction to the start-up section 13a of the printing condition setting section 13 (S1a).

Receiving the start-up instruction from the application section 11, the start-up section 13a outputs a notification of startup to the UI processing section 12 (S2b).

Receiving the start-up instruction, the UI processing section 12 causes the display apparatus 2 to display a window of setting image (S3e).

The UI processing section 12 operates the existing browser 14 provided outside the printer driver section 21 so that the browser 14 displays the setting image in the window. More specifically, the UI processing section 12 specifies a URL corresponding to the setting image data stored in the content item storage section 17, and starts up the browser 14 (S4e).

Figure 5:
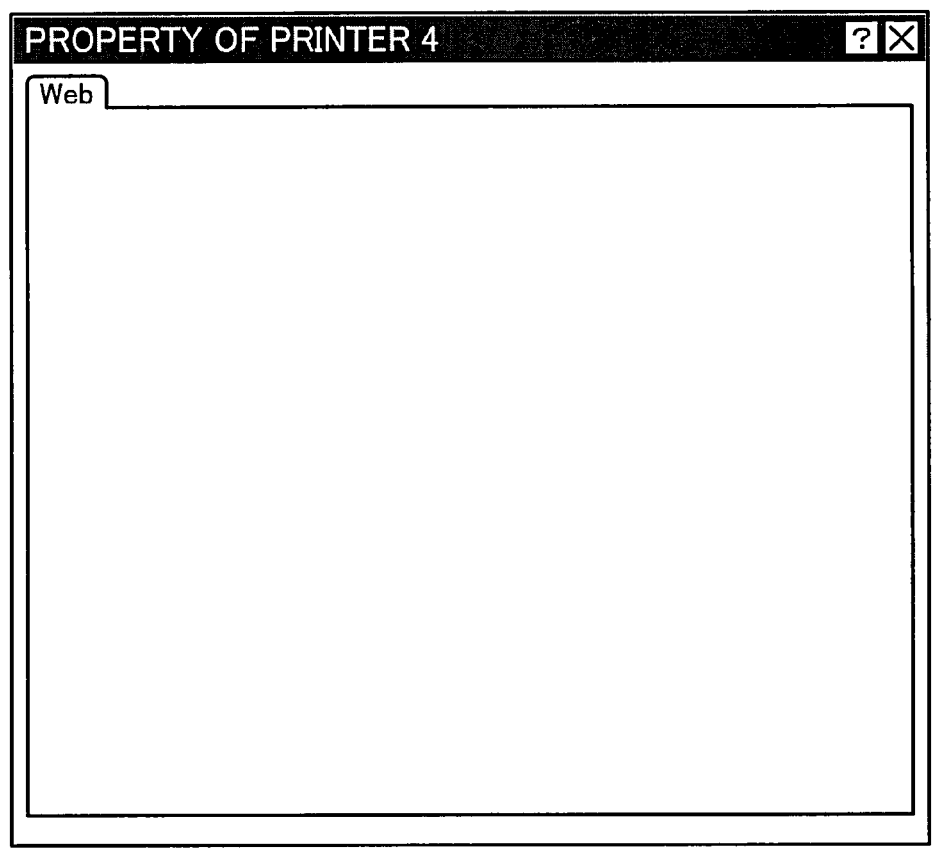
FIG. 5 is a drawing showing a display example of a printing setting window immediately after a browser is started up.

FIG. 5 is a drawing showing a setting image window displayed in the display apparatus 2 by the UI processing section 12 in which an initial image is shown by the browser 14 (the browser 14 has no data to be displayed at this stage, and therefore a blank image is shown).

Next, the browser 14 requests readout of the setting image data corresponding to the URL received from the UI processing section 12 to the request receiving section (RAPS) (S5d).

The request receiving section 15 starts up the CGI processing section 16 according to the request from the browser 14. The CGI processing section 16 obtains the setting image data corresponding to the URL specified by the browser 14. That is, the CGI processing section 16 reads out setting image data from the content item storage section 17 (S6c).

The request receiving section 15 transmits the setting image data obtained by the CGI processing section 16 to the browser 14 which had demanded the data (S7c).

After that, based on the setting image data transmitted from the request receiving section 15, the browser 14 displays the setting image in the window displayed by the UI processing section 12 (S8d).

Figure 6:
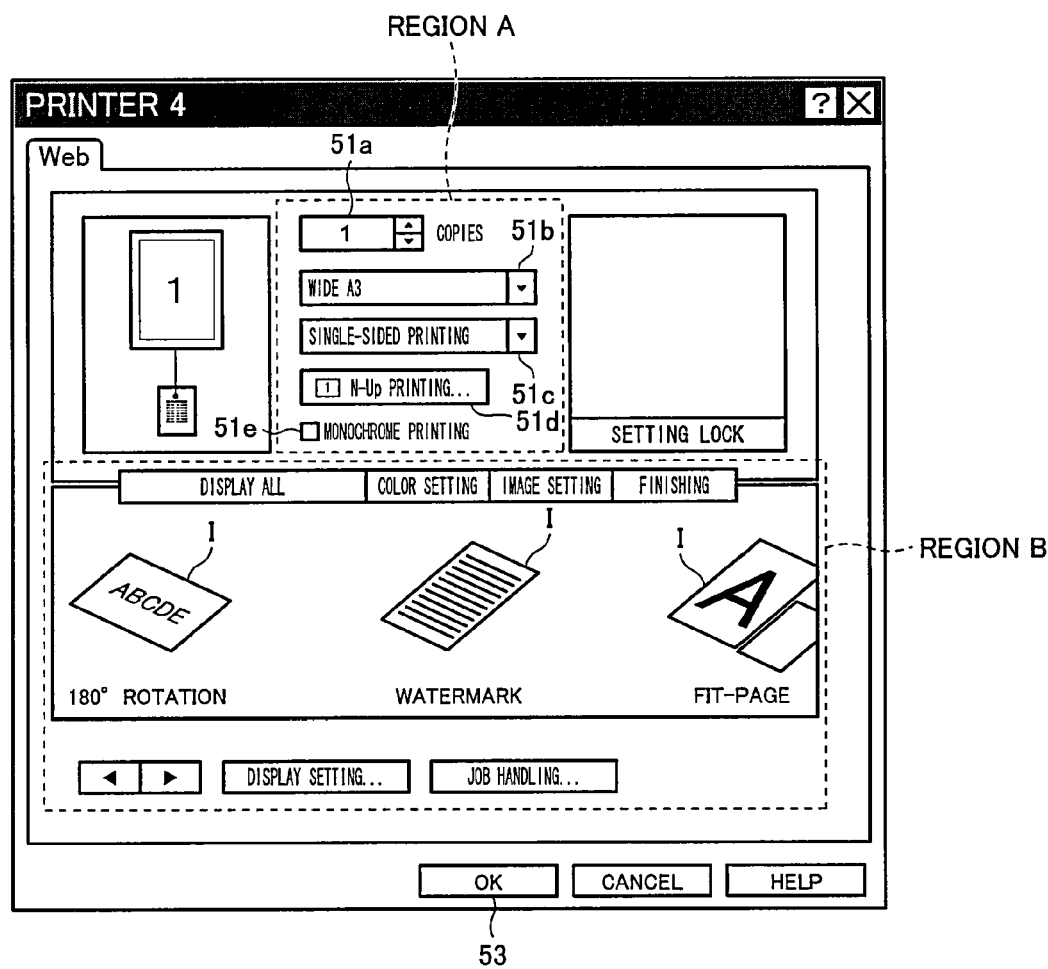
FIG. 6 is a drawing showing an example of printing setting image, which is displayed in a printing setting window by the browser.

FIG. 6 shows an example of setting image window after S8d. In FIG. 6, the browser 14 displays a setting image in the setting image window for allowing the user to input the selected printing condition for the printing operation performed by the printer 4. This setting image corresponds to the setting image data stored in the content item storage section 17.

As shown in FIG. 6, in the present embodiment, the setting image is constituted of a region A for basic functions (such as number of printings, sheet size, single or double sided, N-UP printing, or monochrome printing in this example); and a region B where icons I, which respectively correspond to the functions other than the basic functions (expanded functions) frequently used by the user, sequentially and repeatedly appear, moving to a predetermined direction (eg, right to left). Note that, in the present embodiment, the icons I are moving pictures, created by moving image data. The setting image data contains default detailed conditions. The setting image shown in FIG. 6 is only an example, and the present invention is not limited to them.

Next, the browser 14 determines whether any changes in detailed conditions are made for each of the printing function in the setting image (S9d).

In the case of a setting image shown in FIG. 6, the browser 14 determines whether or not the input detailed conditions of the basic functions, which are inputted through the detailed condition input key/buttons 51a-51e shown in the region A, are different from those in the default setting.

Figure 7:
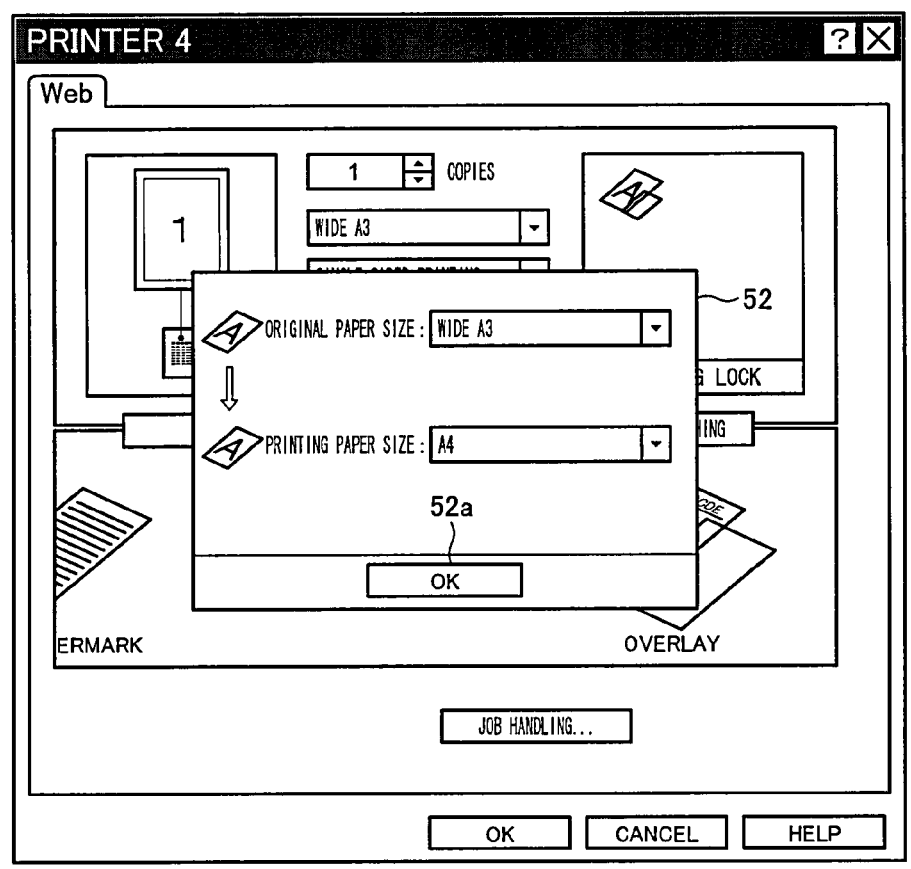
FIG. 7 is a drawing showing an example of a dialog box for demanding the user to input detailed conditions after an icon is clicked.

On the other hand, when one of the icons I in the region B (FIG. 6) is clicked, the browser 14 displays a dialog box through which the user inputs detailed conditions of the printing function, based on the script information contained in the data of the icon. FIG. 7 shows an example of setting image containing a dialog box 52. Then, the browser 14 determines whether or not the input detailed conditions inputted through the dialog box 52 are different from those in the default setting, and whether or not the input completion button (OK button 52a (FIG. 7)) has been clicked.

If no modification is made for any of the printing functions (No in S9d), the sequence goes to S17d.

On the other hand, If some modification is made for the printing functions (Yes in S9d), the browser 14 creates modification information of XML format containing a title (eg. name of the function) of the printing function and the updated detailed condition. The browser 14 then transmits the information to the request receiving section 15 (S10d).

Receiving the modification information, the request receiving section 15 starts up the CGI processing section 16 Then the CGI processing section 16 transmits a request for determination, which contains the name of the printing function and the detailed conditions indicated by the modification information, to the function restriction determination section 13b of the printing condition setting section 13, so as to demand determination as to whether the printing function of the detailed conditions are compatible with the other printing functions (S11c).

Accordingly, the function restriction determination section 13b determines whether the printing function of the detailed conditions indicated by the modification information are compatible with the other printing functions (S12b). At this time, if they are found to be compatible, the function restriction determination section 13b stores the detailed conditions of the printing function received from the CGI processing section 16 into the printing condition keeping section 19. This determination operation is more specifically described later. Then, the function restriction determination section 13b notifies the CGI processing section 16 of the determination result (S13b).

Next, the CGI processing section 16 creates determination result information of XML format which indicates the determination result received from the function restriction determination section 13b (S14c). The request receiving section 15 then transmits the determination result information to the browser 14 (S15c).

After that, the browser 14 carries out operation according to the determination result indicated by the determination result information. Specifically, if they are found to be compatible, the browser 14 accepts modification of detailed conditions, which was inputted at S10d. At this stage, the browser 14 may display the acceptance of modification of detailed conditions.

On the other hand, if they are found to be incompatible, the browser 14 does not process the input modification of detailed conditions, and instead displays a message for notifying the user of incompatibility, demanding the user to change the condition.

After that, the browser 14 determines whether the setting completion button (the "OK button 53" in FIG. 6) is clicked (S17d). If the browser 14 detects that the setting completion button has not been clicked (No in S17d), the sequence goes back to S9d.

On the other hand, if the browser 14 detects that the setting completion button has been clicked (Yes in S17d), the browser 14 creates setting completion information of XML format, and transmits the information to the request receiving section 15 (S18d).

Receiving the setting completion information, the request receiving section 15 starts up the CGI processing section 16. The CGI processing section 16 notifies the setting completion notifying section 13c of completion of condition setting (S19c). As such, the setting completion notifying section 13c receives the notification of completion of condition setting (S20b).

After that, the setting completion notifying section 13c transmits instruction for ending the operation to the UI processing section 12 (S21b). Receiving the instruction, the UI processing section 12 closes the setting image window (S22e).

Meanwhile, the setting completion notifying section 13c notifies the application section 11 of the completion of condition setting (S23b). Receiving the notification of completion of condition setting, the application section 11 outputs an image file to be subjected to printing to the printing job creating section 20 (S24a). Receiving the image file, the printing job creating section 20 creates a printing job based on the image file and the printing conditions stored in the printing condition keeping section 19. The printing job creating section 20 transmits the printing job to the printer 4. Receiving the printing job, the printer 4 carries out the printing job.

(Operation of Determining Compatibility with Other Printing Function)

Figure 8:
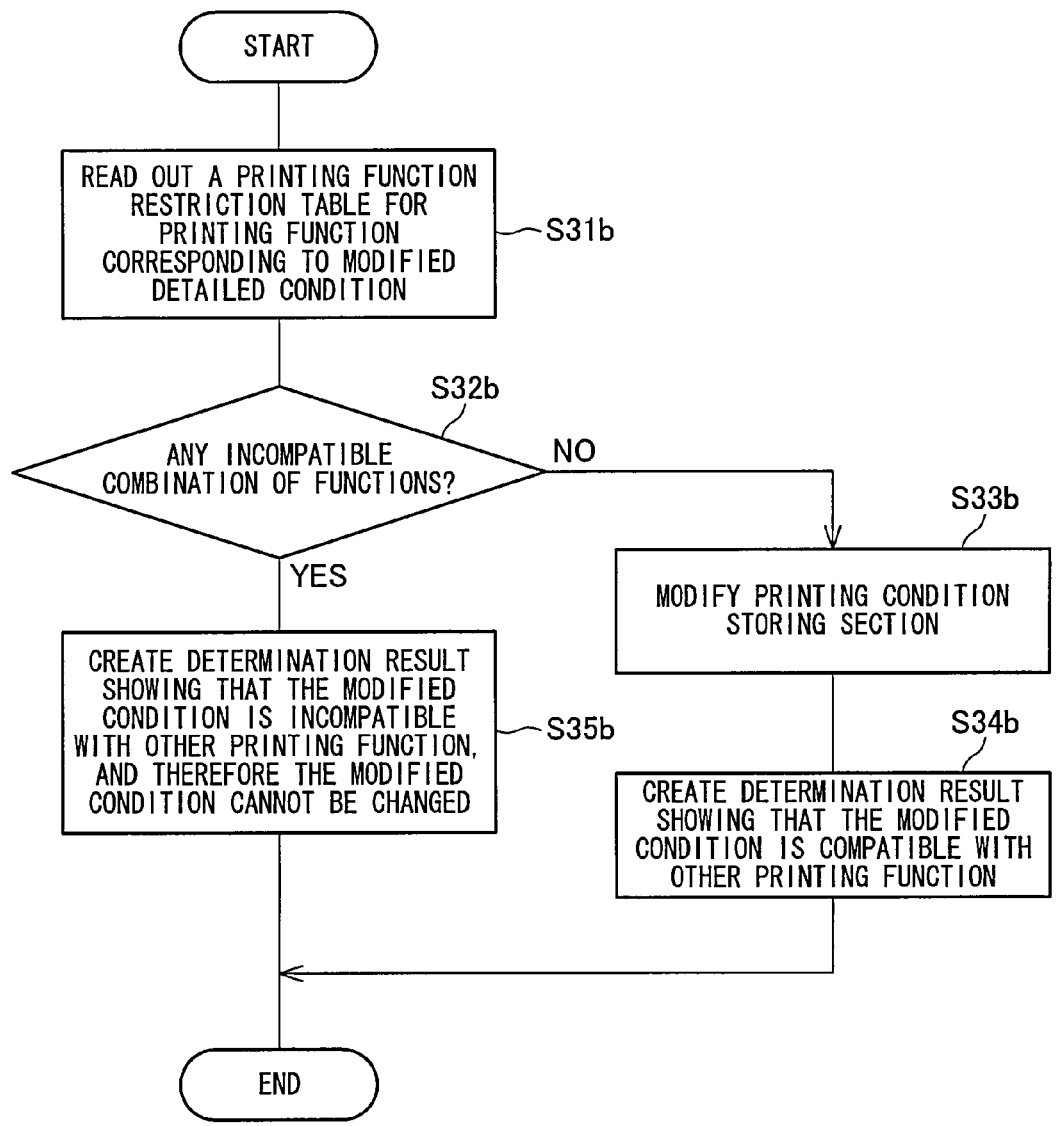
FIG. 8 is a flow chart showing a flow of determination operation as to compatibility of plural printing functions, which is performed by a function restriction determination section.

The following more specifically explains the determination operation in S12b, with reference to flow chart of FIG. 8.

First, the function restriction determination section 13b reads out a printing function restriction table corresponding to the printing function included in the determination request (in other words, the printing function with modified detailed conditions) from the printing function restriction table storage section 18 (S31b).

For example, when the printing function contained in the request is "sheet size", the function restriction determination section 13b reads out all printing function restriction tables showing relationships between "sheet size" and other printing functions (such as the table of FIG. 2).

After that, the function restriction determination section 13b determines whether there is any printing function incompatible with the printing function ("sheet size" in this case") with the specific detailed conditions, based on the obtained printing function restriction table(s) and the detailed conditions contained in the determination request (S32b).

For example, if the detailed condition contained in the determination request is "A3", which is a specific condition for "sheet size" when "midpoint binding" is already selected for the printing function "single or double-sided", the function restriction determination section 13b determines that the condition "A3" for "sheet size" is not compatible with the condition "midpoint binding" for "single or double-sided", with reference to the table of FIG. 2.

In the case where all of the selected conditions are compatible (No in S32b), the function restriction determination section 13b updates the printing condition keeping section 19 based on the content of modification of detailed condition transmitted from the CGI processing section 16 (S33b). After that, the function restriction determination section 13b creates a determination result indicating that all of the selected conditions are compatible (S34b). The function restriction determination section 13b then finishes the determination operation.

On the other hand, if an incompatible combination is found, the function restriction determination section 13b creates a determination result indicating that the detailed condition contained in the determination request cannot be selected since it is incompatible with other conditions (S35b). The function restriction determination section 13b then finishes the determination operation.

As described, the personal computer 1 is an information processing apparatus constituted of: a browser (browsing means) 14 for obtaining data from a internal resource and causing the display apparatus 2 to display an image corresponding to the data; and a printer driver section (printing control means) 21 for controlling printing.

The printer driver section 21 includes a UI processing section (instructing means) 12 for obtaining setting image data for a setting image, which allows the user to input printing condition, from a content item storage section (storage section) 17, and instructing the display apparatus 2 to display a setting image based on the obtained setting image data.

With this structure, the printer driver section 21 only instructs the external browser 14 to carry out display of a setting image based on the setting image data stored in the content item storage section 17.

Accordingly, the printer driver for bringing the printer driver section 21 into operation only requires a program for specifying the processes performed by the UI processing section 12. That is, the printer driver section 21 does not require a program for carrying out display of the setting image. Therefore, the setting image may be modified without editing the whole printer driver.

The browser 14 is set according to the type of setting image. For example, if the setting image is constituted only of still pictures, the instruction from the UI processing section 12 is given to a browser which operates in accordance with software capable of displaying a still picture. If the setting image is constituted of still pictures and moving pictures, the instruction from the UI processing section 12 is given to a browser which operates in accordance with software capable of displaying a still picture and to a browser which operates in accordance with software capable of displaying a moving picture (it may otherwise be given to a browser which operates in accordance with software capable of displaying a still picture and a moving picture). By thus using an appropriate browser as the browser 14, it is possible to display setting images of various formats.

The setting image is displayed by the browser 14 according to the setting image data. Therefore, the setting image may be modified by editing the setting image data stored in content item storage section 17. That is, it is not necessary to modify the whole program for operating the browser 14. On this account, the setting image may be modified even more easily.

Further, editing means is provided most of the cases which performs editing of data to be displayed by the browser 14. Through the editing means, the user can easily edit the setting image data. For example, if the browser 14 is a functional block realized by executing Web browser software by calculating means such as a CPU, the data created with a format compatible with the Web browser can be easily edited (customized) by using common web-page creation software.

Further, the browser 14 determines printing condition according to the user's input through the setting image, and then outputs the printing condition. The printer driver section 21 includes the printing job creating section (printing job creating means) 20 for creating a printing job based on the printing condition determined by the browser 14.

On this account, it is not necessary to perform operation for setting printing condition within the printer driver 21. More specifically, it is not necessary to mount a program for specifying the processes for setting printing condition. With this advantage the printer driver can be simplified.

Further, the function restriction determination section (determining means) 13b obtains the detailed condition of the printing function determined by the browser 14, and determines whether there is any incompatible combination of detailed conditions of printing function based on the printing function restriction table which shows incompatible combinations of details conditions of the plural printing functions. The printer driver section 21 also transmits the determination result to the browser 14 so that the determination result is displayed in the browser 14.

This function allows the user to confirm whether the selected conditions are compatible with each other. If there is any incompatible combination, the setting can be changed. On this account, the printing operation can be securely performed without interference by an error.

The content item storage section 17 is provided inside the personal computer 1. This layout allows the browser 14 to obtain the setting image data from the content item storage section 17 provided in the same apparatus. On this account, the browser 14 can acquires the setting image data more quickly, compared with the case where the setting image data is obtained via a communication network. Accordingly, it is possible to reduce time taken to display the setting image.

Second Embodiment

Another embodiment of the present invention is described below with reference to FIG. 9. For ease of explanation, materials having the equivalent functions as those shown in the drawings pertaining to the foregoing First Embodiment will be given the same reference symbols, and explanation thereof will be omitted here.

In the present embodiment, the server performs a part of operation performed by a personal computer in First Embodiment. More specifically, in the present embodiment, the server keeps the setting image data.

Figure 9:
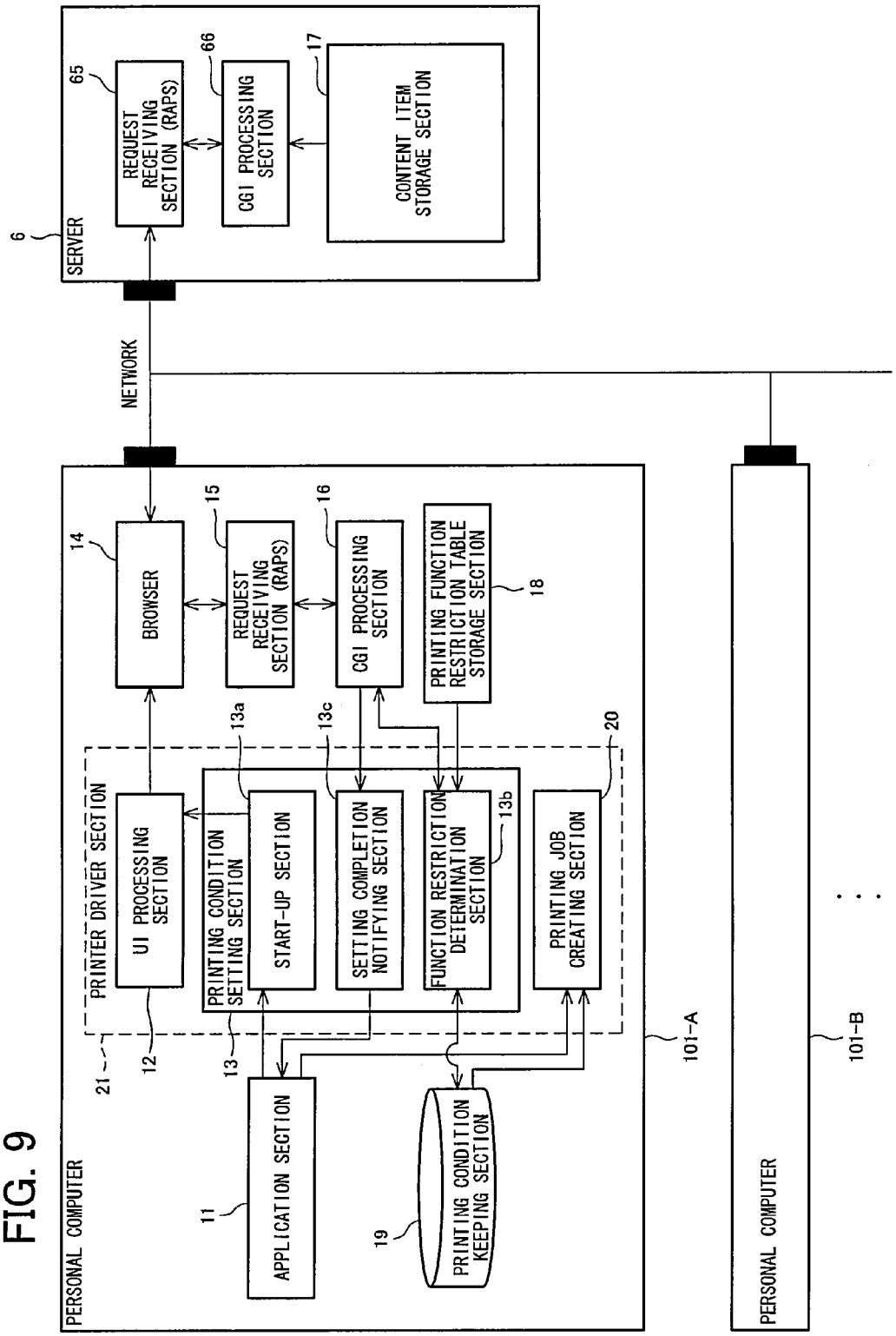
FIG. 9 is a block diagram showing a structure of a printing setting system according to the second embodiment of the present embodiment 2.

FIG. 9 is a block diagram showing respective structures of a personal computer (information processing apparatus) 101 and a server (server apparatus) 6.

As shown in FIG. 9, a plurality of the personal computers 101 (101-A, 101-B, . . . ) and the server 6 carry out bidirectional information exchange via a communication network. Note that, in FIG. 9, the personal computers 101 are respectively connected to the display apparatus 2, the input apparatus 3, and the printer 4, however 2, 3, and 4 are omitted in the figure. The printer 4 may be connected to a personal computer 101 via a communication network.

The server 6 includes a request receiving section (RAPS: Resource Access Protocol Server) 65, a CGI processing section 66, and a content item storage section (storage section) 17.

As with the request receiving section 15 and the CGI processing section 16, the request receiving section 65 and the CGI processing section 66 carries out a predetermined operation in accordance with a request from the personal computer 101.

More specifically, receiving the request of data specified by an URL from the personal computer 101 via a communication network, the request receiving section 65 starts up the CGI processing section 66. Then the CGI processing section 66 obtains data corresponding to the URL from the content item storage section 17, and outputs the data to the request receiving section 65. Then the request receiving section 65 sends back the data came from the CGI processing section 66 to the personal computer 101, which has demanded the data. Note that, the request receiving section 65 transmits the setting image data by using HTTP.

Further, as shown in FIG. 9, the personal computer 101 does not include the content item storage section 17, unlike the personal computer 1.

Also, in contrast to First Embodiment, the UI processing section (instructing means) 12 of the present embodiment starts up the browser 14 by specifying the URL corresponding to the setting image data kept in the content item storage section 17 included in the server 6.

Consequently, the browser 14 requests setting image data, which is specified by the URL, to the server 6 through the communication network, and receives the data from the server 6. Note that, the other operations performed by the browser 14 are the same as those of First Embodiment. That is, the browser 14 transmits the modification information and the setting completion information to the request receiving section 15 in the personal computer 101.

The flow of the operation for setting printing condition is substantially the same as those in the flow chart shown in FIGS. 3 and 4.

However, the sequence is different in the following points. In S4e, the UI processing section 12 specifies the URL stored in the content item storage section 17 of the server 6, thereby starting the browser 14.

In S5d, the browser 14 requests the request receiving section 65 of the server 6 to read out the setting image data corresponding to the URL received from the UI processing section 12.

In S6c, the CGI processing section 66 reads out setting image data corresponding to the URL from the content item storage section 17. The request receiving section 15 transmits the setting image data obtained by the CGI processing section 66 to the browser 14 which had demanded the data (S7c).

After that, based on the setting image data transmitted from the server 6, the browser 14 displays the setting image in the window displayed by the UI processing section 12 (S8d).

Note that, during S5d through S8d, the request receiving section 65 transmits the setting image data by using HTTP.

The rest of the series of operation is the same as that of First Embodiment.

As described, the personal computer 101 is an information processing apparatus constituted of: a browser 14 for obtaining data from an external resource and causing the display apparatus 2 to display an image corresponding to the data; and a printer driver section 21 for controlling printing. The printer driver section 21 includes an UI processing section (instructing means) 12 for obtaining setting image data for a setting image, which allows the user to input printing condition, from a content item storage section (storage section) 17, and instructing the display apparatus 2 to display a setting image based on the obtained setting image data. On this account, the present embodiment also ensures the effect of easy modification of setting image, as with First Embodiment.

The present embodiment further differs from First Embodiment in that the content item storage section 17 is provided in an external server apparatus 6. With this arrangement, the personal computer 101 is not required to store the setting image data. Further, the all setting images displayed in the respective personal computers 101 (101-A, 101-B, . . . ), each of which obtains setting image data from the server apparatus 6, can be modified by simply modifying the setting image data stored in the server apparatus 6. In other words, the setting images displayed in the plurality of personal computers 101 may be modified at once.

Third Embodiment

Still another embodiment of the present invention is described below with reference to FIG. 10. For ease of explanation, materials having the equivalent functions as those shown in the drawings pertaining to the foregoing Embodiments will be given the same reference symbols, and explanation thereof will be omitted here.

In First or Second Embodiment, the personal computer includes a printing condition setting section 13. However, the printing condition setting section 13 may be provided in an external server apparatus. As with Second Embodiment, the server in this embodiment stores the setting image data, and is provided with a condition setting section 13.

Figure 10:
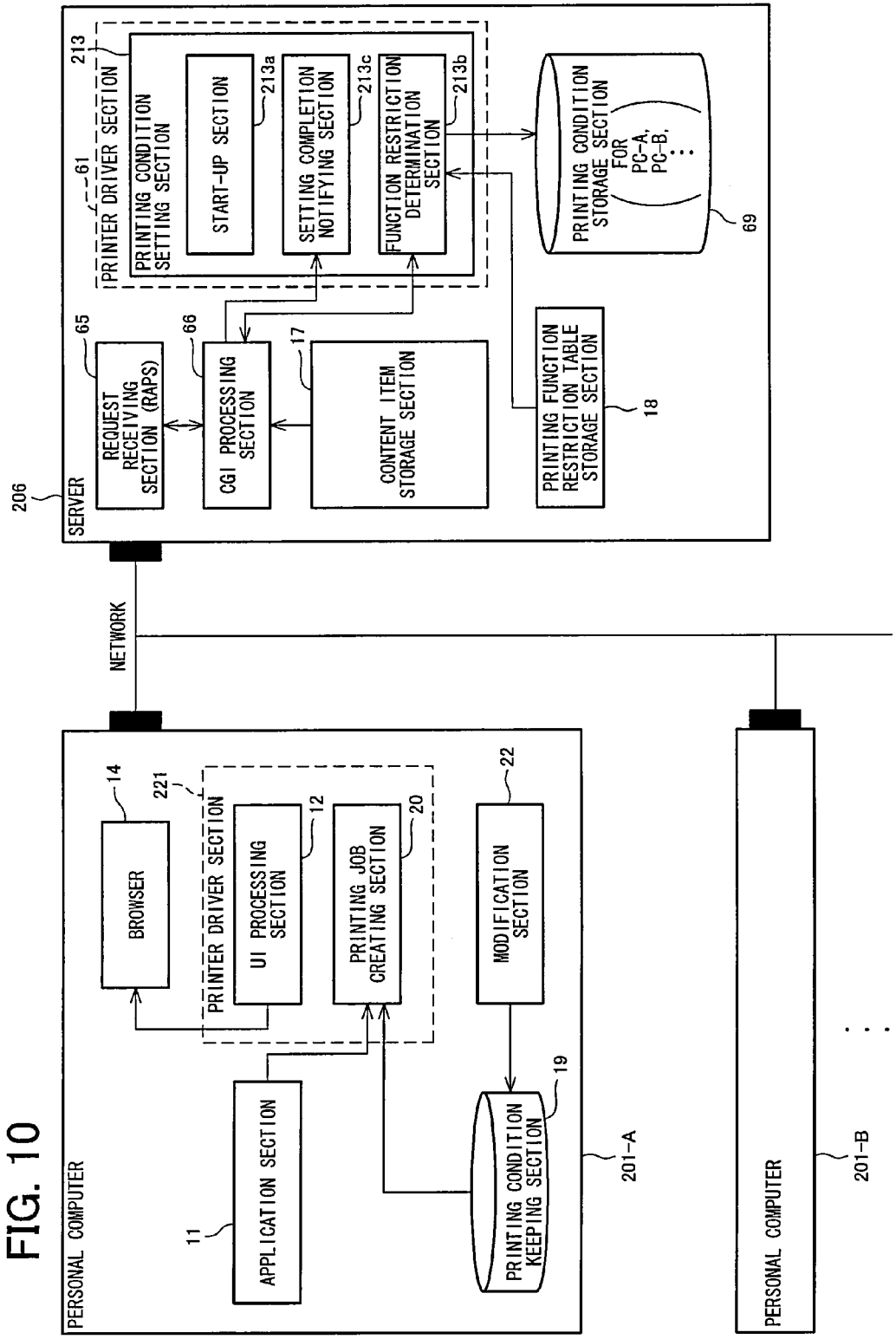
FIG. 10 is a block diagram showing a structure of printing setting system according to the third embodiment of the present invention.

FIG. 10 is a block diagram showing a structure of a personal computer 201 and a server 206 which constitute a printing control system according to the present embodiment.

As shown in FIG. 10, a plurality of the personal computers 201 (201-A, 201-B, . . . ) and the server (server apparatus) 206 carry out bi-directional information exchange via a communication network. Note that, in FIG. 10, the personal computers 201 are respectively connected to the display apparatus 2, the input apparatus 3, and the printer 4, however 2, 3, and 4 are omitted in the figure. This is the same as FIG. 1. The printer 4 may be connected to a personal computer 201 via a communication network.

The server 206 includes a request receiving section (RAPS: Resource Access Protocol Server) 65, a CGI processing section 66, a printing condition setting section 213, and the content item storage section (storage section) 17, and the printing function restriction table storage section 18. The server 206 includes a printing condition keeping section 69. The printing condition setting section 213 includes a start-up section 213*a*, a function restriction determination section (determining means) 213*b* and a setting completion notifying section 213*c*. The printing condition setting section 213 constitutes a printer driver section 61.

The request receiving section 65 and the CGI processing section 66 are identical in function to the request receiving section 15 and the CGI processing 16, respectively.

However, in contrast to the request receiving section 15, the request receiving section 65 exchanges information with the browser 14 of the personal computers 201 via a communication network, and specifies a personal computer 201 in the sender-end (i.e., the personal computer 201 which has transmitted information such as request for setting image data, modification information, setting completion information). The request receiving section 65 is otherwise identical to the request receiving section 15.

Also, in contrast to the CGI processing section 16, the CGI processing section 66 transmits to the function restriction determination section 213*b* PC identification information for specifying the personal computer 201 in the sender-end (i.e., the personal computer 201 which has transmitted the modification information) at the time of sending the determination request to the function restriction determination section 213*b*. Similarly, in contrast to the CGI processing section 16, the CGI processing section 66 transmits to the setting completion notifying section 213*c* PC identification information for specifying the personal computer 201 in the sender-end (i.e., the personal computer 201 which has transmitted the setting completion notification) at the time of sending the setting completion notification to the setting completion notifying section 213*c*.

As with the printing condition keeping section 19, the printing condition keeping section 69 stores the determined printing conditions. However, the printing condition keeping section 69 stores the printing conditions for each of the personal computers 201. The printing conditions stored in the printing condition keeping section 69 are updated by the function restriction determination section 213*b*.

The start-up section 213*a* is identical in function to the start-up section 13*a*. However, in contrast to the start-up section 13*a*, the start-up section 213*a* boots up the UI processing section 12 of the personal computer 201 via a communication network in response to the startup instruction which is transmitted from the application section 11 of the personal computer 201 through the communication network.

The personal computer 201 is always capable of communication with the start-up section 213*a* via a communication network, for example, through some kind of communication means or the like (not shown). Further, the start-up section 213*a* always accepts the startup instruction from the application section 11 of any of the personal computer 201 via the communication means and the communication network. When receiving a startup instruction from a personal computer 201, the start-up section 213*a* sends an instruction for starting up the UI processing section 12 to the personal computer 201, which has transmitted the startup instruction. The communication means outputs a startup instruction came from the start-up section 213*a* to the UI processing section 12.

The function restriction determination section 213*b* is identical in function to the function restriction determination section 13*b*. However, in contrast to the function restriction determination section 13*b*, the function restriction determination section 213*b* modifies printing condition corresponding to a personal computer 201 specified by the PC identification information, which is transmitted from the CGI processing section 66, at the time of updating the printing condition stored in the printing condition keeping section 69 according to the determination request from the CGI processing section 66.

The setting completion notifying section 213*c* is identical in function to the setting completion notifying section 13*c*. However, in contrast to the setting completion notifying section 13*c*, the setting completion notifying section 213*c* transmits an instruction for finishing display of the setting image to the UI processing section 12 of a certain personal computer 201 specified by the PC identification information which is transmitted from the CGI processing section 66 via a communication network. The setting completion notifying section 213*c* also transmits a setting completion notification to the application section 11 of the personal computer 201.

The personal computer 201 is always capable of communication with the start-up section 213*a* via a communication network, for example, through some kind of communication means or the like (not shown). Then, the setting completion notifying section 213*c* transmits the instruction for finishing display of the setting image and the setting completion notification to the communication means of the personal computer specified by the PC identification information via the communication network. Meanwhile, the communication means transmits the instruction for finishing display of the setting image transmitted from the setting completion notifying section 213c to the UI processing section 12, and transmits the setting completion notification transmitted from the setting completion notifying section 213c to the application section 11. However, method of transmitting/receiving the instruction for finishing display of the setting image and the setting completion notification, which are respectively transmitted from the setting completion notifying section 213c to the UI processing section 12 and the application section 11, is not limited to the above manner.

On the other hand, the personal computer 201 includes a printer driver 221 constituted of the application section 11, the UI processing section 12, the printing job creating section 20; the browser 14; a modification section 22; and the printing condition keeping section 19.

Note that, as with Second Embodiment, the UI processing section 12 of the present embodiment also starts up the browser 14 by specifying the URL corresponding to the setting image data kept in the content item storage section 17 included in the server 206.

The modification section 22 reads out printing condition corresponding to the personal computer 201 in which the modification section 22 is provided, among printing conditions for plural personal computers 201 stored in the printing condition keeping section 69 of the server 206 via a communication network, so as to updates the printing condition keeping section 19 of the personal computer 201 so that the conditions in the printing condition keeping section 19 become identical to those in the printing condition keeping section 69 of the server 206. The modification section 22 makes access to the printing condition keeping section 69 either at all times or at a certain time interval. With this arrangement, the printing conditions stored in the printing condition keeping section 19 of the personal computer 201 are always the same as those in the printing condition keeping section 69 of the server 206.

The flow of the operation for setting printing conditions in the present embodiment is the same as that shown in FIGS. 3 and 4.

However, the sequence is different from that of First Embodiment in the following points.

In S4e, the UI processing section 12 specifies the URL corresponding to the setting image data stored in the content item storage section 17 of the server 6, thereby starting the browser 14.

In S5d, the browser 14 requests to the request receiving section 65 of the server 206 the setting image data corresponding to the URL received from the UI processing section 12.

In S6c, the CGI processing section 66 reads out setting image data corresponding to the URL from the content item storage section 17. The request receiving section 65 transmits the setting image data obtained by the CGI processing section 66 to the personal computer 201 which had demanded the data (S7c).

After that, in S8d, based on the setting image data transmitted from the server 206, the browser 14 of the personal computer 201 displays a setting image.

In S10d, the browser 14 of the personal computer 201 transmits modification information of XML format to the request receiving section 65 of the server 206.

Then, in S11c, the CGI processing section 66 transmits a request for determination to the function restriction determination section 213b, together with PC identification information by which the function restriction determination section 213b can specify the personal computer which has transmitted the modification information. Thereafter, the sequence goes to the processes S12b, S13b, and S14c, which are carried out by the function restriction determination section 213b of the server 206.

Then, in S15c, the request receiving section 65 transmits determination result information via the communication network to the browser 14 of the personal computer 201 which has transmitted the modification information. Note that, the request receiving section 65 transmits the setting image data by using HTTP.

Further, in S18d, the browser 14 of the personal computer 201 transmits the setting completion information of XML format to the request receiving section 65 of the server 206.

Then, in S19c, the CGI processing section 66 notifies the setting completion notifying section 213c of completion of condition setting, together with PC identification information which specifies the personal computer 201 which has transmitted the modification information.

Thereafter, the setting completion notifying section 213c instructs the UI processing section 12 of the personal computer 201 specified by the PC identification information to stop displaying the setting image, and also transmits a notification of completion of setting to the application section 11 of the same personal computer 201.

Note that, the request receiving section 65 transmits the setting image data by using HTTP.

Further, the modification section 22 of the personal computer 201 makes access to the printing condition keeping section 69 of the server 206 either at all time or at a certain interval. The modification section 22 reads out printing condition corresponding to the personal computer 201 in which the modification section 22 is provided, among printing conditions for plural personal computers 201 stored in the printing condition keeping section 69, so as to updates the printing condition keeping section 19 of the personal computer 201.

The foregoing printer driver section 221 according to the present embodiment includes an UI processing section 12 which instructs the browser 14 to obtain setting image data, which corresponds to a setting image for allowing the user to set printing condition, from the content item storage section 17, and to cause the display apparatus 2 to display the setting image expressed by the setting image data. The content item storage section 17 is provided in the server apparatus 6.

Further, the server apparatus 206 includes the function restriction determination section (determining means) 213b which obtains the detailed condition of the printing function determined by the browser 14, and determines whether there is any incompatible combination of detailed conditions of printing function based on the printing function restriction table which shows incompatible combinations of details conditions of the plural printing functions. The function restriction determination section 213b also causes the browser 14 to display the determination result through the display apparatus 2.

This function allows the user to confirm whether the selected conditions are compatible with each other. If there is any incompatible combination, the setting can be changed. On this account, the printing operation can be securely performed without interference by an error.

Further, since the function restriction determination section 213b is provided in the server apparatus 206, all of the determination operations as to incompatibilities of the plural printing conditions can be performed in the server apparatus 206. Accordingly, the operation load of each personal computer 201 is reduced.

Fourth Embodiment

Yet another embodiment of the present invention is described below with reference to FIGS. 11 to 13. For ease of explanation, materials having the equivalent functions as those shown in the drawings pertaining to the foregoing Embodiments will be given the same reference symbols, and explanation thereof will be omitted here.

In contrast to the foregoing Second and Third Embodiments in which the browser of the personal computer obtains the setting image data from the server, the setting image data of the present embodiment is constituted of a plurality of data parts, a part of which is previously stored in a personal computer, and the rest is stored in the server. As such, the browser of the personal computer obtains a part of the setting image data from an internal storage section, and obtains the rest from the server. With this structure, a part of the acquisition of the data parts may be performed without connecting the browser with the communication network. The speed for displaying the setting image is therefore increased.

For example, in the case where the setting image is a moving picture which changes with time, a preferable arrangement is that data parts constituting the setting image to be displayed in a certain period in the beginning of the image are stored in a personal computer, and the data parts constituting the setting image to be displayed after the period are stored in the server. With this arrangement, the browser obtains the data parts stored in an internal storage section without being connected to the communication network, thereby displaying the setting image immediately after the start-up for certain duration. In the meantime, the browser obtains the rest of data parts from the server via the communication network.

Figure 11:
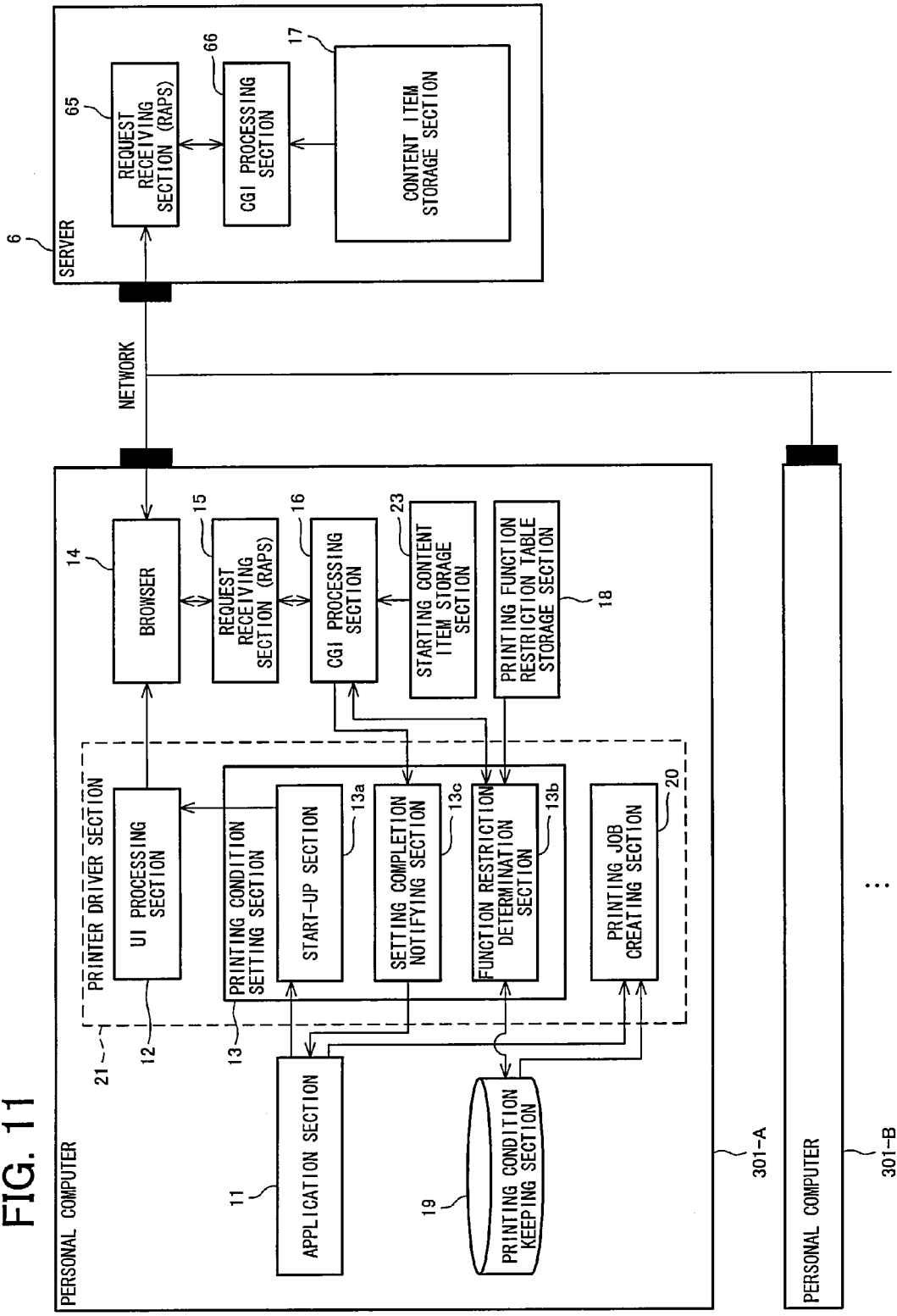
FIG. 11 is a block diagram showing a structure of printing setting system according to the fourth embodiment of the present invention.

FIG. 11 is a block diagram showing respective structures of a personal computer 301 and a server 306 constituting the printing control system according to the present embodiment.

In contrast to the personal computer 101 according to Second Embodiment, the personal computer (information processing apparatus) 301 contains a starting content item storage section (first storage section) 23.

The starting content item storage section 23 stores the data parts (hereinafter referred to as starting image composing data) constituting the setting image to be displayed in a certain period in the beginning of the image, out of the plurality of data parts constituting the whole setting image. Further, the data of the starting image contains an URL corresponding to the rest of data parts (hereinafter referred to as remaining data) constituting the setting image to be displayed after the period.

Note that, in the present embodiment, the UI processing section (instructing means) 12 specifies an URL corresponding to the starting image composing data stored in the starting content item storage section 23, at the time of starting up the browser 14.

In contrast to the server 6 according to Second Embodiment, the server 306 includes a content item storage section (second storage section) 317 instead of the content item storage section 17. The content item storage section 317 stores the remaining data.

(Operation for Setting Printing Condition)

The flow of operation for setting printing conditions according to the present embodiment is schematically the same as that of Second Embodiment. However, the operation is different from that of Second Embodiment for the details of operation for displaying the setting image. In the present embodiment, the operation for displaying the setting image is carried out according to the flow chart shown in FIG. 12. After that, the sequence is followed by the flow chart of FIG. 4.

Figure 12:
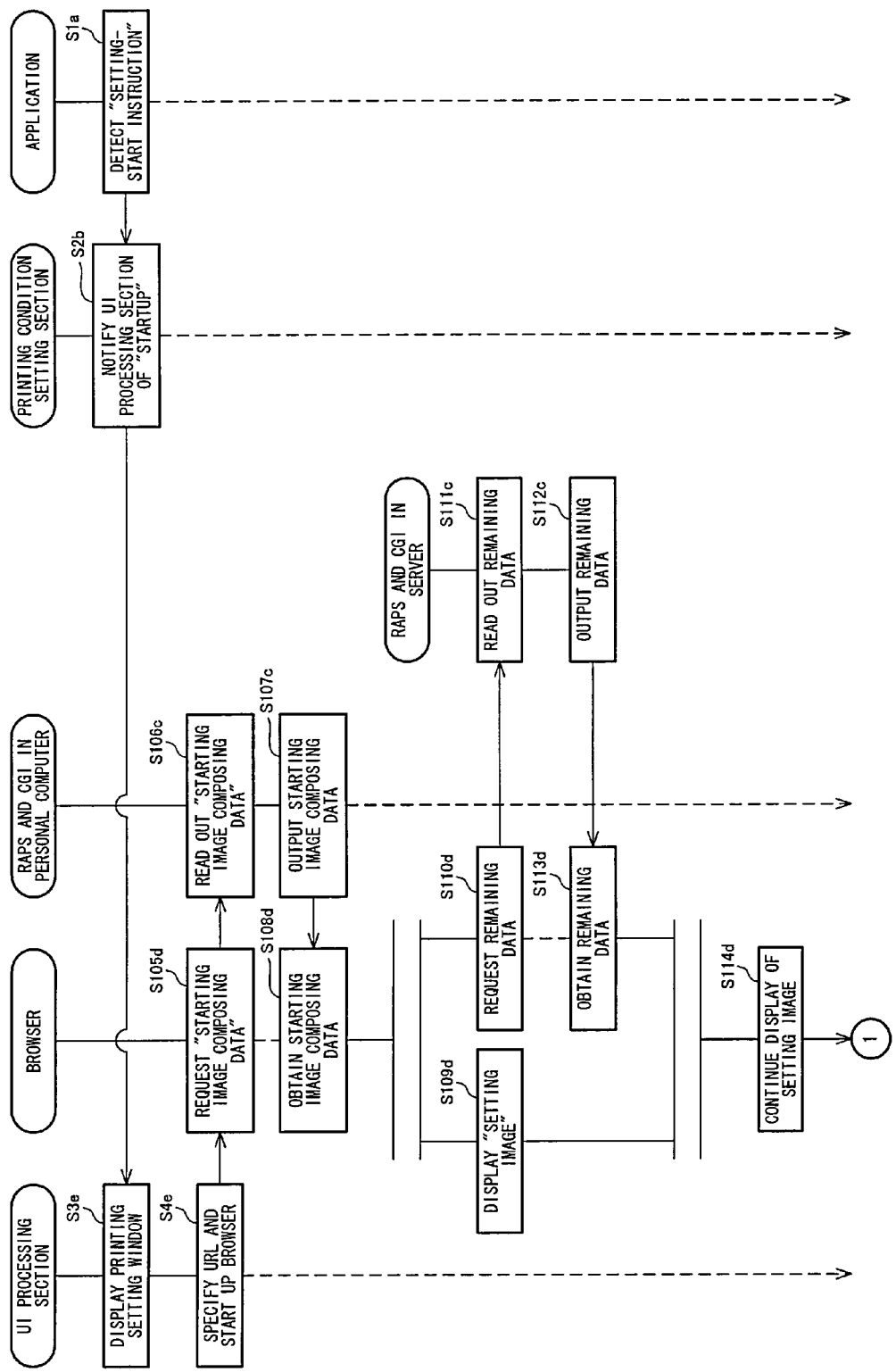
FIG. 12 is a flow chart showing a flow of display operation of a printing setting image according to the fourth embodiment of the present invention.

As shown in FIG. 12, S1a, SS2b, S3e and S4e are sequentially performed. However, in S4e, the UI processing section 12 specifies a URL corresponding to the starting image composing data stored in the starting content item storage section 23, and starts up the browser 14.

After that, the browser 14 transmits a request for the starting image composing data corresponding to the URL with respect to the request receiving section 15 of the personal computer 301 (S105d).

Receiving the request for the starting image composing data, the request receiving section 15 starts up the CGI processing section 16. The CGI processing section 16 reads out the starting image composing data from the starting content item storage section 23 based on the URL specified by the browser 14 (S106c).

The request receiving section 15 then transmits the starting image composing data thus read out by the CGI processing section 16 to the browser 14 (S107c). As such, the browser 14 obtains the starting image composing data (S108d).

Then, to start the display, the browser 14 displays a setting image based on the starting image composing data for a certain time period (S109d).

At the same time of S109d, the browser 14 also transmits a request for the remaining data specified in the URL contained in the starting image composing data with respect to the request receiving section 65 of the server 306 (S110d).

Receiving the request for the remaining data, the request receiving section 65 of the server 306 starts up the CGI processing section 66. Then the CGI processing section 66 reads out the remaining data from the content item storage section 317 based on the URL specified by the browser 14 (S111c).

The request receiving section 65 transmits the remaining data thus read out by the CGI processing section 66 to the browser 14 via the communication network (S112c). As such, the browser 14 obtains the remaining data (S113d).

After the certain time period elapsed as set in the starting image composing data, the browser 14 maintains the display of setting image based on the remaining data (S114d).

As described, the setting image data according to the present embodiment is constituted of a plurality of data parts. A part of the data parts is stored in the starting content item storage section (first storage section) 23 of the personal computer 301, and the rest is stored in the content item storage section (second storage section) 317. The browser 14 obtains the data parts from the starting content item storage section 23 and the content item storage section 317, and displays the setting image based on the data parts.

More specifically, the UI processing section 12 causes the browser 14 to obtain a part of the data parts constituting the setting image from the starting content item storage section 23 in the same apparatus, and to obtain the remaining data from the content item storage section 317 in the external server 306.

With this arrangement, it is not necessary to store the whole setting image data in the personal computer 301. Further, since the capacitance of the data parts stored in the starting content item storage section 23 is larger than the capacity of the data parts stored in the content item storage section 317, the browser 14 obtains the larger amount of data parts without being connected to the communication network. The time taken to obtain the setting image data is thus reduced.

Note that, though the present embodiment has been described as the modification of Second Embodiment, the present embodiment is also applicable to the system of Third Embodiment using the server having a printing condition setting section.

The following describes some concrete examples of the present embodiment. As with FIG. 6, the setting image according to the present example is constituted of a plurality of icons, which correspond to plural different printing functions and sequentially appear in the predetermined region B within the setting image, moving to a predetermined direction (eg, right to left).

EXAMPLE 1

In the present example, the above-mentioned starting image composing data includes icon data D-1 and icon data D-2, which respectively correspond to the first icon I-1 to a predetermined later icon (second, in this example) I-2, and also includes data corresponding to a part outside the region B. On the other hand, the remaining data includes icon data (icon data (3). . . ) corresponding to icon I-3 . . . . The icon I-3 . . . are the third and later icons in the region B of the setting image FIG. 13 is a drawing showing a display example of the region B of the setting image of the present example, and an operation flow for obtaining the starting image composing data and the remaining data.

Figure 13:
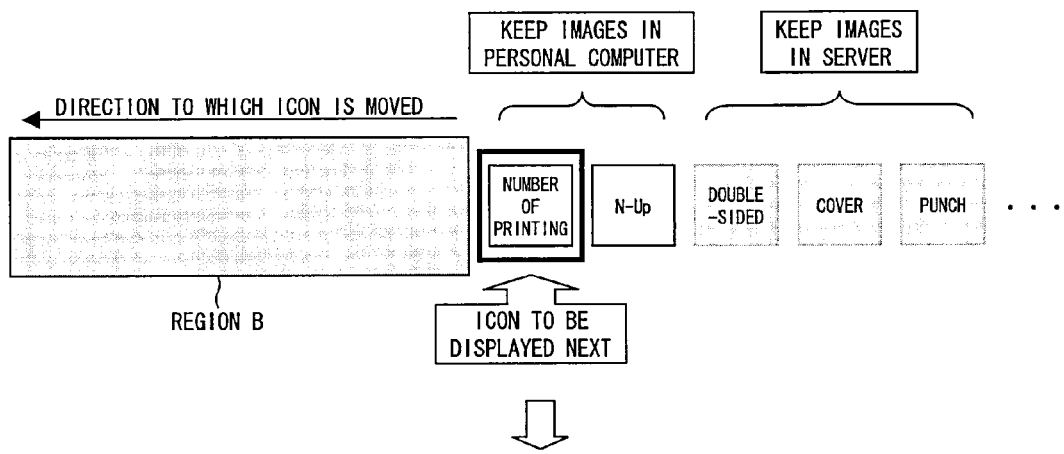
FIG. 13 is a drawing showing an example of a setting image according to "Example 1" of the fourth embodiment of the present invention.
Figure 13:
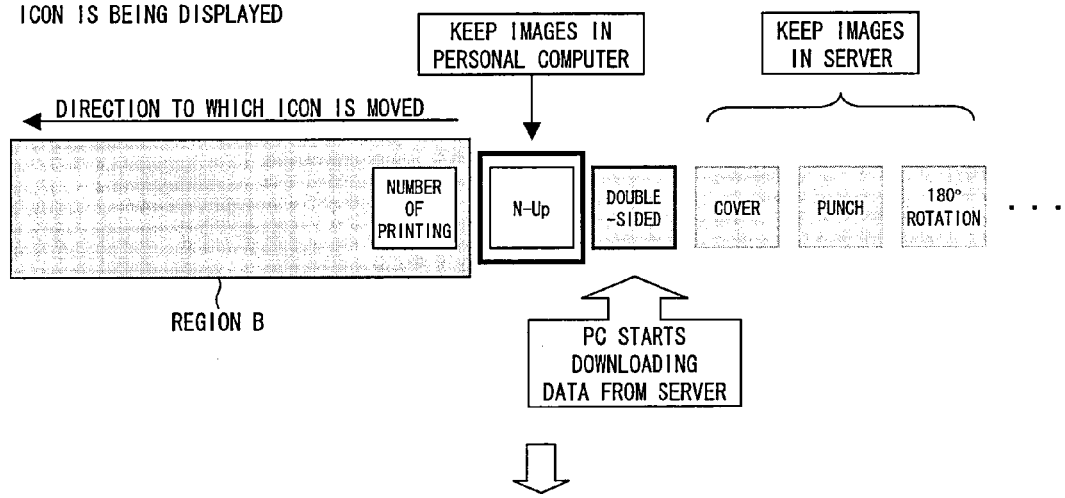
Figure 13:
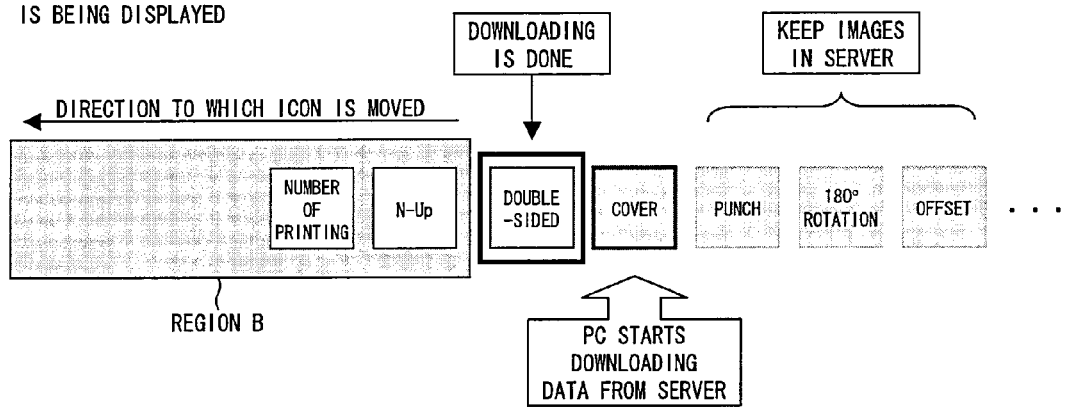

As shown in FIG. 13, when the browser 14 is started by the starting instruction given by the UI processing section 12, the browser 14 reads out the starting image composing data (corresponding to data outside the region B, data for icons I-1, I-2) from the starting content item storage section 23 of the personal computer 301 via the request receiving section 15 and CGI processing section 16. The data corresponding to the icons I-3 . . . is stored in the server 306.

Then the browser 14 displays the first icon I-1 in the right end of the region B and moves it to the left. Note that, the browser 14 carries out the operation for moving the icon in accordance with the program contained in the starting image composing data.

At this time, the browser 14 transmits a request for the icon data D-3 corresponding to the third icon I-3 with respect to the request receiving section 65 of the server 306, and downloads the icon data D-3 from the server 306.

After that, the icon I-1 is eventually moved to the predetermined position in the region B, and then the browser 14 displays the second icon I-2 in the right end of the region B and moves it to the left. The display operation for moving the icon I-2 is the same as that for the icon I-1.

At this time, the browser 14 transmits a request for the icon data D-4 corresponding to the fourth icon I-4 with respect to the request receiving section 65 of the server 306, and downloads the icon data D-4 from the server 306.

In this manner, the browser 14 keeps the series of operation in which the browser 14 displays the moving icon in the region B in accordance with the downloaded icon data while downloading other icon data from the server 306.

As described, the setting image according to the present example is constituted of a plurality of icons, which sequentially appear in the setting image. The starting content item storage section 23 stores icon data, which respectively correspond to the first icon to a predetermined later icon (second, in this example). The data for the remaining icons are stored in the content item storage section 317 of the server 306.

As such, the browser 14 obtains icon data corresponding to the first and second icons from the starting content item storage section 23 in the same device. Since in this case the browser 14 is not required to be connected to the communication network, the time taken to obtain the setting image data is reduced.

The browser 14 displays the first and second icons while downloading the remaining images from the external server 306 so that the third and later icons are displayed as soon as the display of the second icon is finished.

On this account, the sequential display of the plurality of icons can be performed more quickly. Besides, it is not necessary to store the data for all icons in the personal computer 301.

EXAMPLE 2

In the present example, the icon I to be displayed in the region B is a moving image. More specifically, the icon data is moving-image data, which is constituted of a first part corresponding to the first frame and a second part corresponding to the second frame.

In the present embodiment, the starting image composing data is constituted of the first-part data of the moving-image data for each icon, data corresponding to the region other than the region B among the setting image. Further, the second data of the moving-image data of each icon serves as the remaining data.

Figure 14:
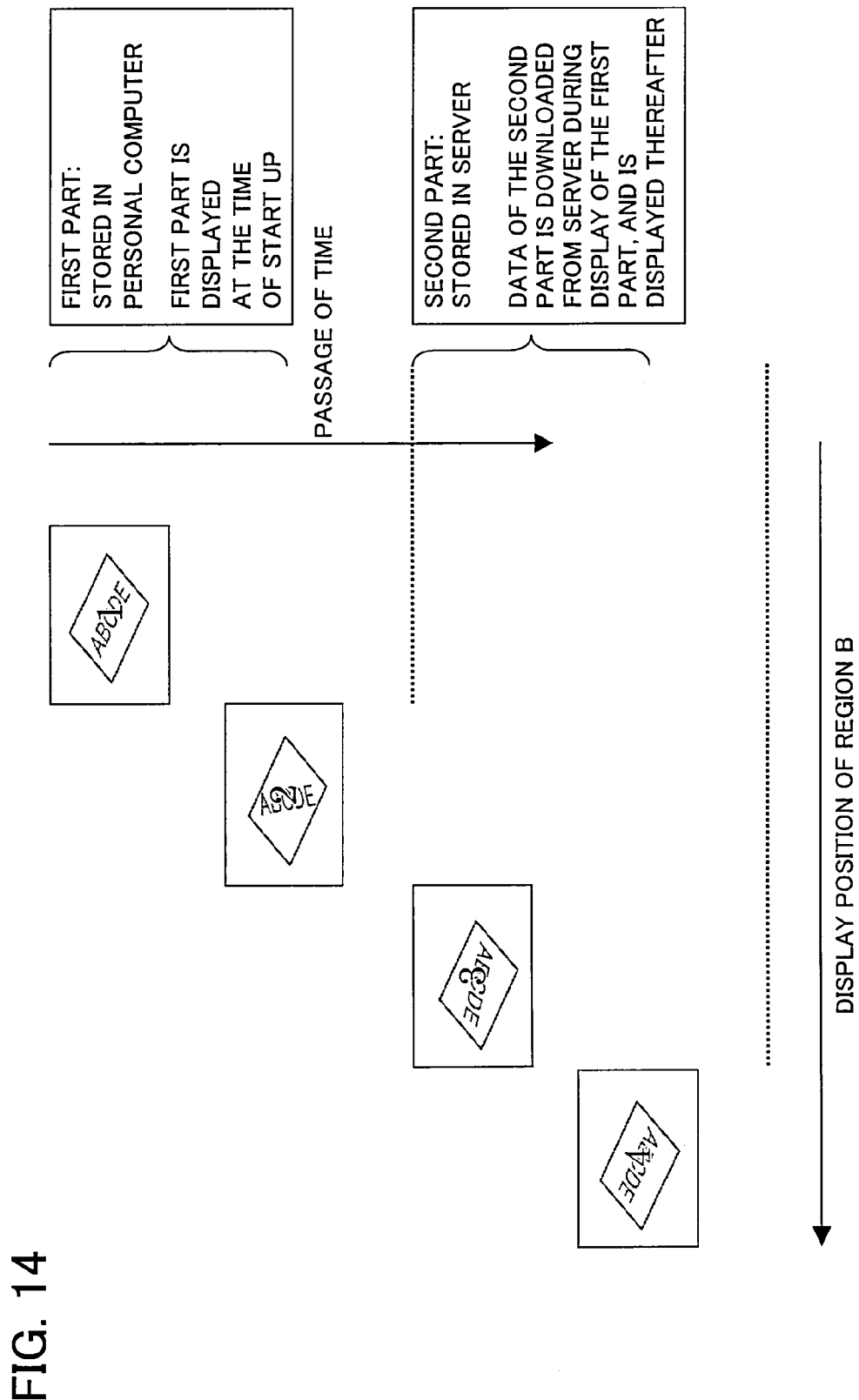
FIG. 14 is a drawing showing an example of a setting image according to "Example 2" of the fourth embodiment of the present invention.

Therefore, as shown in FIG. 14, the browser 14 of the personal computer 301 displays the first part of the moving image of each icon based on the first data contained in the starting image composing data which is stored in the starting content item storage section 23 of the personal computer 301. While displaying the first part, the browser 14 sends a transmission request for the second-part data corresponding to the second part of the icon with respect to the request receiving section 65 of the server 306, and downloads the second-part data from the server 306.

After that, as the display of the first part of each icon finishes, the browser 14 starts the display of the second part of the icon based on the second-part data.

In this manner, the browser 14 of the personal computer 301 according to the present embodiment displays the first part of the moving image of each icon based on the first data contained in the starting image composing data which is read out from the starting content item storage section 23 of the personal computer 301. Then, after the display of the first part of the icon is finished, the browser 14 displays the second part based on the second-part data, which was downloaded from the server 306 during the display of the first part.

As described, the setting image according to this Example 2 contains a moving image which is constituted of plural items of frame data. The starting content item storage section 23 of the personal computer 301 stores the first to a predetermined numbered data among the plural data items, while the content item storage section 317 of the server 306 stores the remaining data items.

With this structure, the browser 14 acquires the first to a predetermined numbered data from the internal starting content item storage section 23. On this account, the browser 14 obtains the data items more quickly compared with the case where the browser 14 obtains those data items through a communication network.

According to this embodiment, the browser 14 displays images corresponding to a certain number of items starting from the first item among the frame data item while acquiring the remaining frame data items from the server 306. The browser 14 then displays images corresponding to the remaining frame data items as the display of the image corresponding to the predetermined number of data items finishes.

With this arrangement, the time taken for the browser 14 to begin displaying the moving image is reduced. Moreover, the personal computer 301 is not required to store the whole of the large amount of frame data constituting the moving image.

Note that, in Examples 1 and 2, the display operation and the downloading of data from the server 6 are carried out in accordance with the program written in the starting image composing data and the remaining data.

As described, the starting content item storage section 23 of the personal computer 301 stores the starting image composing data corresponding to the first part of the setting image, which is an image displayed for a predetermined time in the beginning of the display. This allows the browser 14 of the personal computer 301 to immediately obtain the starting image composing data without being connected to the communication network. On this account, the time taken to display the moving image since the browser 14 is started can be reduced.

Further, the browser 14 displays the setting image based on the starting image composing data while downloading the remaining data of the setting image, which is to be displayed after a predetermined time elapsed, from the server 306. On this account, the personal computer 301 is not required to store the whole of frame data constituting the setting image data. Therefore, the storage section of the personal computer 301 for storing the setting image may have a smaller capacity.

MODIFICATION EXAMPLE (Modification of Storage Condition of the Content Item Storage Section)

In Embodiments 1 through 3 above, the content item storage section 17 may store the setting image data for each user. At this time, the UI processing section 12 starts up the browser 14 by identifying the login user and specifying an URL containing the login user name. Then, receiving a transmission request from the browser 14, the CGI processing section reads out the setting image data corresponding to the login user name shown in the URL from the content item storage section 17.

The respective content item storage sections 17 according to Embodiments 1 through 3 may also store the setting image data on the basis of application. At this time, the UI processing section 12 identifies the application which has transmitted the startup instruction to the start-up section 13*a*, and starts up the browser 14 by specifying a URL containing information (eg. name of application) for identifying the application. Then, receiving the transmission request from the browser 14, the CGI processing section reads out the setting image data corresponding to the name of the application shown in the URL from the content item storage section 17.

Further, also in the Second and Third Embodiments, the content item storage section 17 may store the setting image data on the basis of personal computer. At this time, the UI processing section 12 starts up the browser 14 by specifying a URL containing information (eg. ID) for identifying the personal computer in which the UI processing section 12 is contained. Then, receiving the transmission request from the browser 14, the CGI processing section reads out the setting image data corresponding to the ID shown in the URL from the content item storage section 17.

This modification is also applicable to the structure of Fourth Embodiment.

(Customization of Setting Image Data)

The personal computer 1, 101, 201, 301 or the server 6, 206, 306 may includes an editing section (not shown) for editing data items stored in the content item storage section 17, 317 or the starting content item storage section 23.

As described above, the setting image data (including the starting image composing data and the remaining data) is written in HTML that the user can browse through the browser 14. Therefore, the setting image can be easily customized by editing the setting image data which is written in HTML.

The edition of the setting image data by the editing section is performed by using conventional Web (Home Page) creation applications.

This allows the administrators of the server 6 to create a common setting image within the same department, or create an original setting image for each administrator. In the case of displaying icons of the plural different printing functions sequentially and repeatedly as shown in FIG. 6, the user can customize the setting image by modifying the number, order, size, size of region B (where the icons are displayed) and/or basic function (number of sheets, double-sided) of the icons, or by editing the images of the icons.

(Modification Example of Determining Operation as to Compatibility of Plural Printing Functions)

Figure 15:
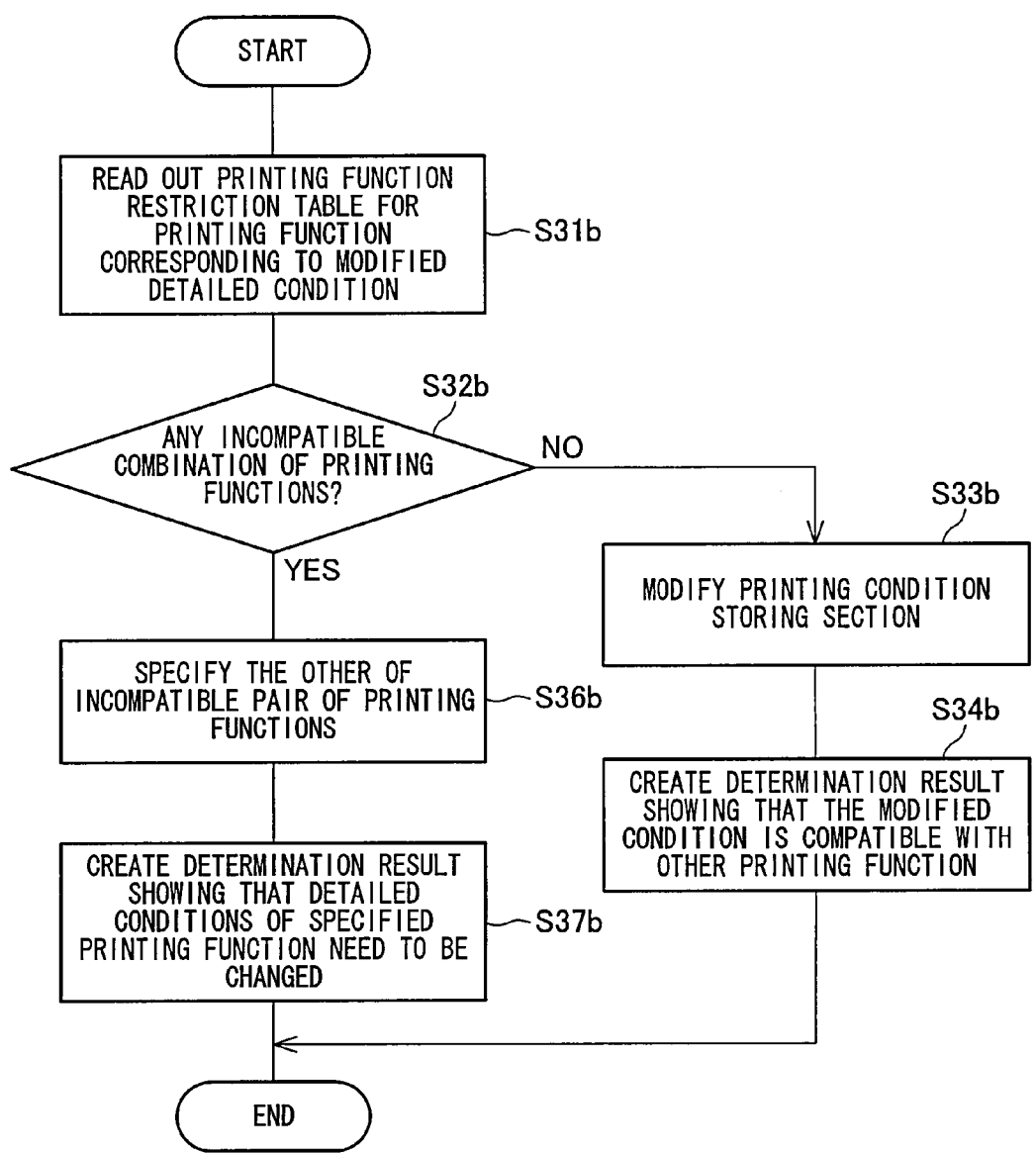
FIG. 15 is a flow chart showing a flow of a modification of determination operation as to compatibility of plural printing functions, which is performed by a function restriction determination section.

The following explains modification of determination operation in the step S12*b*. FIG. 15 is a flow chart showing a flow of modification of determination operation.

First, the sequence proceeds by carrying out the steps S31*b* to S32*b*. If all of the detailed conditions are found to be compatible, (No in S32*b*), the steps S33*b* and S34*b* are carried out.

On the other hand, if an incompatible combination is found (Yes in S32*b*), the function restriction determination section 13*b*/213*b* specifies the printing function contained in the determination request transmitted from the CGI processing section 16/66, and the printing function incompatible with the detailed function of the printing function in the determination request (S36*b*).

Then, the function restriction determination section 13*b*/213*b* creates a determination result indicating that the detailed condition of the specified printing function needs to be modified (S37*b*).

The determination result is displayed through the browser 14, and the user is notified of which printing function is required to be changed for its detailed conditions to set the detailed conditions of the printing function inputted immediately before the notification display.

(Others)

In the foregoing example, the browser 14 outputs the modification information to the request receiving section 15/65 each time a detailed condition of a printing function is inputted. However, the browser 14 may transmit the detailed conditions of the all printing functions to the request receiving section 15/65 in response to clicking action of the setting completion button (the OK button 53 of FIG. 6). In this case, the function restriction determination section 13*b*/213*b* determines whether the any of plural printing functions are incompatible.

Further, in the case where if there are not many types of printing functions, and therefore all (or most of them) of the functions are compatible with each other, the function restriction determination section 13*b*/213*b* is not always required in the printing setting system in the respective embodiments. In this case, the browser 14 transmits the detailed conditions of the all printing functions to the setting completion notifying sections 13*c*/213*c* via the request receiving section 15/65 and the CGI processing sections 16 and 66 in response to clicking action of the setting completion button (the OK button 53 of FIG. 6). Then, the setting completion notifying section 13c/213c stores the all detailed conditions of the acquired printing functions into the printing condition keeping section 19/69. Otherwise, the setting completion notifying section 13c/213c notifies the application section 11 of the all detailed conditions of the acquired printing functions.

In the example above, the browser 14 carries out operation according to Web browser software. However, the browser 14 is not limited to a Web browser. The browser 14 can be realized by any types of browsing means capable of displaying a setting image under instruction of the UI processing section 12. The browsing means is at least required to have a function of acquiring data from a resource inside of a personal computer or a resource on a network, and displaying an image expressed by the data in the display apparatus 3.

Finally, the respective blocks of personal computer 1/101/201/301, especially the printer driver section 21/321 and the server 6/206/306, particularly the printer driver section 61 of the server 206, may be constituted of a hardware logic, or may be realized by software with a CPU as follows.

Specifically, the personal computer 1/101/201/301 and the server 6/206/306 include, for example, a CPU (Central Processing Unit) for enforcing the commands of a control program for realizing the respective functions; a ROM (Read Only Memory) for storing the program; a RAM (Random Access Memory) for developing the program; and a storage device (storage medium) such as a memory for storing the program and the various data. The object of the present invention may be attained by enforcing a program code (execute form program, intermediate code program, source program) of software for realizing the respective functions of the personal computer 1/101/201/301 and the server 6/206/306, which is stored in a program medium readable by a computer, and by providing the medium to the personal computer 1/101/201/301 and the server 6/206/306. In this case, the program code stored in the storage medium is read out (enforced) by the computer (or, by CPU, MPU).

Examples of the program medium include one fixedly holds the program code, which can be (a) a tape system such as a magnetic tape, a cassette tape or the like, (b) a disk system which includes a magnetic disk such as a floppy disk®, a hard disk or the like and an optical disk such as a CD-ROM, an MO, an MD, a DVD or the like, (c) a card system such as an IC card (inclusive of a memory card), an optical card or the like, and (d) a semiconductor memory such as a mask ROM, an EPROM, an EEPROM, a flash ROM.

Further, the personal computer 1/101/201/301 and the server 6/206/306 may be constituted to be connectable to a communication network. In this case, the program code is supplied via the communication network. The communication network is not particularly limited, and it may be: the Internet, Intranet, Extranet, LAN, ISDN, VAN, CATV communication network, virtual private network, telecommunication network, mobile body communication network, satellite communication network etc. Further, a transmission medium for constituting the communication network is not particularly limited, and it may be wired based, such as IEEE1394, USB, power-line carrier, cable TV line, telephone line, ADSL line, or radio based, such as infrared medium such as IrDA, remote control, Bluetooth, 802.11 radio, HDR, mobile phone network, satellite communication line, ground wave digital network. Note that, the present invention may be realized in the form of a carrier wave, or a data signal line that realizes the program code by electronic transmission.

As described, an information processing apparatus according to the present invention comprises browsing means for obtaining data from a resource and displaying an image expressed by the data in a display apparatus; and printing control means for controlling a printing operation, the printing control means including instructing means for instructing the browsing means to obtain setting image data from a storage section which stores the setting image data which corresponds to a setting image for setting printing conditions and to display the setting image expressed by the setting image data in the display apparatus.

The printing control means designates a functional block realized by carrying out certain processes specified by a printer driver program (hereinafter referred simply as a printer driver) by some kind of calculating means such as a CPU.

The "resource" designates a hardware resource in the information processing apparatus or a resource on a communication network.

With the foregoing arrangement, the printing control means includes instructing means for obtaining setting image data for a setting image, which allows the user to input printing condition, from a storage section, and instructing a display apparatus to display a setting image based on the obtained setting image data. With this structure, the printing control means only instructs the external browsing means to carry out display of a setting image based on the setting image data stored in the storage section.

Accordingly, the printer driver only requires a program for specifying the processes performed by the instructing means. That is, the printer driver does not require a program for carrying out display of the setting image. Therefore, the setting image may be modified without editing the whole printer driver. This allows easy modification of setting image.

The browsing means, which causes the display apparatus to display the setting image under instruction by the instruction section, is set according to the type of setting image. For example, if the setting image is constituted only of still pictures, the instruction from the instruction section is given to a browsing means which operates in accordance with software capable of displaying a still picture. If the setting image is constituted of still pictures and moving pictures, the instruction from the instruction section is given to a browsing means which operates in accordance with software capable of displaying a still picture and to a browser which operates in accordance with software capable of displaying a moving picture (it may otherwise be given to a browser which operates in accordance with software capable of displaying both a still picture and a moving picture). By thus using an appropriate browser, it is possible to display setting images of various formats.

Further, the display function owned by the browsing means can be used by the browsing means, and also by the printing control means. In many cases, the browsing means is originally equipped with many functions regarding image-display. Accordingly, it is not necessary to structure the whole information processing apparatus. For example, in the case of structuring the apparatus in the form of a program, the programming work can be omitted. In the case of structuring the apparatus in the form of a circuit, the circuit designing can be omitted.

Further, the setting image is displayed by the browsing means based on the setting image data. Therefore, the setting image may be modified by editing the setting image data stored in storage section. That is, it is not necessary to modify the whole browsing means. On this account, the setting image may be modified even more easily.

Further, an editing means is provided most of the cases which performs editing of data to be displayed by the browsing means. Through the editing means, the user can easily edit the setting image data. For example, if the browsing means is a functional block realized by executing Web browser software by a calculation section such as a CPU, the data created with a format compatible with the Web browser can be easily edited (customized) by using common web-page creation software.

In addition to the foregoing structure, the information processing apparatus according to the present invention is preferably arranged so that the browsing means sets printing conditions based on input by a user through the setting image, and the printing control means includes printing job creating means for creating a printing job based on the printing conditions set by the browsing means.

With this arrangement, the browsing means determines printing condition according to the user's input through the setting image. The printing job creating means obtains the printing condition set by the browsing means, and creates a printing job based on the printing condition.

On this account, it is not necessary to perform operation for setting printing condition within the printing control means. More specifically, it is not necessary to mount a program for specifying the processes for setting printing condition. With this advantage the printer driver can be simplified.

In addition to the foregoing structure, the information processing apparatus according to the present invention is preferably arranged so that the browsing means sets detailed conditions for each of a plurality of printing functions based on input information by a user through the setting image, the printing control means includes determining means which obtains the detailed conditions for each of the printing functions set by the browsing means so as to determine whether or not there is an incompatible combination among the detailed conditions obtained, based on a function restriction table which shows an incompatible combination of the detailed conditions of the printing functions, and the browsing means displays a determination result given by the determining means in the display apparatus.

With this arrangement, the browsing means determines printing condition according to the user's input through the setting image. On this account, it is not necessary to perform operation for setting printing condition within the printing control means. More specifically, it is not necessary to mount a program for specifying the processes for setting printing condition. With this advantage the printer driver can be simplified.

Further, the determining means determines whether or not there is an incompatible combination among the detailed conditions obtained, and causes the browsing means to display a determination result in the display apparatus. This function allows the user to confirm whether the set conditions are compatible with each other. If there is any incompatible combination, the setting can be changed. On this account, the printing operation can be securely performed without interference by an error.

Further, in addition to the foregoing structure, the information processing apparatus according to the present invention may be arranged so that the storage section is provided in an external server. With this arrangement, the information processing apparatus is not required to store the setting image data. Further, the all setting images displayed in the respective information processing apparatuses, each of which obtains setting image data from the server apparatus, can be modified by simply modifying the setting image data stored in the server apparatus. In other words, the setting images displayed in the plurality of information processing apparatuses may be modified at once.

In addition to the foregoing structure, the information processing apparatus according to the present invention may further comprise the storage section. This layout allows the browsing means to obtain the setting image data from the storage section provided in the same apparatus. On this account, the browsing means can acquire the setting image data more quickly, compared with the case where the setting image data is obtained via a communication network. Accordingly, it is possible to reduce time taken to display the setting image.

In addition to the foregoing structure, the information processing apparatus according to the present invention is preferably arranged so that the setting image data is constituted of a plurality of partial data items, and the storage section includes a first storage section for storing a part of the plural partial data items, and a second storage section for storing remaining part of the partial data items. The first storage section is provided in the information processing apparatus, and the second storage section is provided in an external server.

With the foregoing arrangement, the instructing means causes the browsing means to obtain a part of the data parts constituting the setting image from the first storage section in the same apparatus, and to obtain the remaining data from the second storage section in the external server.

With this arrangement, it is not necessary to store the whole setting image data in the information processing apparatus. Further, the browsing means obtains the part of data parts from a storage section in the same device without being connected to the communication network. The time taken to obtain the setting image data is thus reduced.

In addition to the foregoing structure, the information processing apparatus according to the present invention is arranged so that the setting image contains a moving image, and the partial data items corresponding to frame data items express the moving image. The first storage section stores a predetermined number of consecutive frame data items starting from a first frame data item, and the second storage section stores the remaining frame data items.

With this structure, the browsing means acquires a predetermined number of consecutive data starting from a first data from the internal first storage section. On this account, the browsing means obtains the data items more quickly compared with the case where the browsing means obtains those data items through a communication network.

According to this embodiment, the browsing means displays images corresponding to the a certain number of consecutive items starting from a first item among the frame data items while acquiring the remaining frame data items from the external server. The browsing means then displays images corresponding to the remaining frame data as the display of the image corresponding to the certain number of data items finishes.

With this arrangement, the time taken for the browsing means to begin displaying the moving image is reduced. Moreover, the information processing apparatus is not required to store the whole of the large amount of frame data constituting the moving image.

In addition to the foregoing structure, the information processing apparatus according to the present invention is arranged so that the setting image is constituted of a plurality of images which are sequentially displayed, and the partial data items correspond to image data items expressing the plurality of images. The first storage section stores a predetermined number of consecutively displayed image data items starting from an image data item to be displayed first, and the second storage section stores remaining image data items.

With this structure, the browsing means acquires a predetermined number of consecutive image data items starting from the first image data from the internal first storage section. On this account, the browsing means obtains the image data items more quickly compared with the case where the browsing means obtains those data items through a communication network.

According to this embodiment, while displaying images corresponding to a certain number of consecutive image data items starting from the first image item among image data items, the browsing means also acquires the remaining image data items from the external server. The browsing means then displays images corresponding to the remaining image data as the display of the image corresponding to the predetermined number of image data items finishes.

With this arrangement, the time taken for the browsing means to begin sequentially displaying the moving image is reduced. Moreover, the information processing apparatus is not required to store the whole of the large amount of image data items.

In addition to the foregoing structure, the information processing apparatus according to the present invention is preferably arranged so that the setting image data corresponds to a setting image in which a plurality of icons for a plurality of printing functions are sequentially displayed.

It takes a significantly long time to create a printer driver for displaying a setting image in which icons of plural printing functions are sequentially displayed. However, in the present invention, the setting image data constituting the setting image is stored in the storage section, and display operation of setting image is performed by the browsing means outside the printing control means. Accordingly, it is not necessary to edit the printer driver to modify the setting image. The modification of setting image may be performed only by editing the setting image data stored in the storage section.

In addition to the foregoing structure, the information processing apparatus according to the present invention is preferably arranged so that the storage section stores the setting image data for each user, and the instructing means specifies a user who inputs display instruction regarding the setting image, and causes the browsing means to obtain setting image data corresponding to the user specified.

With this arrangement, the user may use the setting image according to his/her own need. Otherwise, the administrator sets available printing functions for each user, allowing individuals to respectively modify the setting image. On this account, the administrator can ensure prevention of use of printing functions without permission. For example, when the administrator desires to permit color printing only to a specific person, it can be done by displaying a setting image which prevents the other users (users other than a specific user) from using color printing function.

In addition to the foregoing structure, the information processing apparatus according to the present invention is preferably arranged so that the storage section stores the setting image data on an application basis, and the instructing means specifies an application by which a printing image was created, and causes the browsing means to obtain setting image data corresponding to the application.

With this arrangement, the user can use a setting image suitable for the application by which the image to be printed was created.

In addition to the foregoing structure, the information processing apparatus according to the present invention is preferably arranged so that the storage section stores a plurality items of the setting image data for a plurality of information processing apparatus, and the instructing means causes the browsing means to selectively obtain setting image data of a corresponding information processing apparatus.

With this arrangement, the setting image may be modified for each information processing apparatus. For example, when the administrator desires to permit color printing only to an information processing apparatus owned by a specific department, it can be done by displaying a setting image which prevents users of other departments (departments other than a specific department) from using color printing function.

A server apparatus according to the present invention is a server apparatus capable of communication with the foregoing information processing apparatus through a communication network, the server apparatus comprising determining means which obtains detailed conditions for each of plural printing functions set by the browsing means so as to determine whether or not there is an incompatible combination among the detailed conditions obtained, based on a function restriction table which shows an incompatible combination of the detailed conditions of the printing functions, the determining means causing the browsing means to display a determination result in the display apparatus.

With this arrangement, the determining means determines whether there is any incompatible combination among the obtained detailed conditions of the printing functions. Also, the browsing means displays the determination result in the display apparatus. This function allows the user to confirm whether the selected conditions are compatible with each other. If there is any incompatible combination, the setting can be changed. On this account, the printing operation can be securely performed without interference by an error.

Further, since the determining means is provided in the server apparatus, all of the determination operations as to incompatibilities of the plural printing conditions can be performed in the server apparatus. Accordingly, the operation load for each information processing apparatus is reduced. Further, the operation by the determining means may be modified (eg. to update the function restriction table) by only changing the determining means in the server apparatus.

Further, a printing control system according to the present invention comprises a plurality of information processing apparatuses and a server apparatus, which communicate with each other through a communication network. The information processing apparatus comprising browsing means for obtaining data from a resource and displaying an image expressed by the data in a display apparatus; and printing control means for controlling a printing operation. The server apparatus stores setting image data which corresponds to a setting image for setting printing conditions. The printing control means includes instructing means for instructing the browsing means to obtain setting image data from a storage section which stores the setting image data which corresponds to a setting image for setting printing conditions and to display the setting image expressed by the setting image data in the display apparatus.

With this structure, the printing control section only instructs the external browser to carry out display of a setting image based on the setting image data stored in the storage section.

Accordingly, the printer driver only requires a program for specifying the processes performed by the instructing means. That is, the printing control means does not require a program for carrying out display of the setting image. Therefore, the setting image may be modified without editing the whole printer driver.

With this arrangement, the information processing apparatus is not required to store the setting image data. Further, the all setting images displayed in the respective information processing apparatuses, each of which obtains setting image data from the server apparatus, can be modified by simply modifying the setting image data stored in the server apparatus. In other words, the setting images displayed in the plurality of information processing apparatuses may be modified at once.

Further, the information processing apparatus or the server apparatus may be realized by a computer. In this case, the scope of the present invention includes a printer driver program for causing a computer to function as the printing control means of the information processing apparatus, and a computer-readable storage medium storing the program. Further, in the case of realizing the determining means by a computer, the scope of the present invention includes the program for realizing the server apparatus by a computer, and the computer-readable storage medium storing the program.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An information processing apparatus comprising:
   browsing means for obtaining data from a resource and displaying, according to a Web browser, an image expressed by the data in a display apparatus; and
   printing control means for controlling a printing operation,
      the printing control means including instructing means for instructing the browsing means to obtain setting image data from a storage section which stores the setting image data which corresponds to a setting image for setting printing conditions and to display the setting image expressed by the setting image data in the display apparatus, wherein
      the browsing means sets detailed conditions for each of a plurality of printing functions based on input by a user through the setting image,
      the printing control means includes determining means which obtains the detailed conditions for each of the printing functions set by the browsing means so as to determine whether or not there is an incompatible combination among the detailed conditions obtained, based on a function restriction table which shows an incompatible combination of the detailed conditions of the printing functions, and
      the browsing means displays a determination result given by the determining means in the display apparatus.

2. The information processing apparatus as set forth in claim 1, wherein:
   the browsing means sets printing conditions based on input by a user through the setting image, and the printing control means includes printing job creating means for creating a printing job based on the printing conditions set by the browsing means.

3. The information processing apparatus as set forth in claim 1, wherein:
   the storage section is provided in an external server.

4. The information processing apparatus as set forth in claim 1, further comprising the storage section.

5. The information processing apparatus as set forth in claim 1, wherein:
   the setting image data corresponds to a setting image in which a plurality of icons for a plurality of printing functions are sequentially displayed.

6. The information processing apparatus as set forth in claim 1, wherein:
   the storage section stores the setting image data for each user, and the instructing means specifies a user who inputs display instruction regarding the setting image, and causes the browsing means to obtain setting image data corresponding to the user specified.

7. The information processing apparatus as set forth in claim 1, wherein:
   the storage section stores the setting image data on an application basis, and the instructing means specifies an application by which a printing image was created, and causes the browsing means to obtain setting image data corresponding to the application.

8. The information processing apparatus as set forth in claim 3, wherein:
   the storage section stores a plurality items of the setting image data for a plurality of information processing apparatus,
   and
   the instructing means causes the browsing means to selectively obtain setting image data of a corresponding information processing apparatus.

9. An information processing apparatus comprising:
   browsing means for obtaining data from a resource and displaying, according to a Web browser, an image expressed by the data in a display apparatus; and
   printing control means for controlling a printing operation,
      the printing control means including instructing means for instructing the browsing means to obtain setting image data from a storage section which stores the setting image data which corresponds to a setting image for setting printing conditions and to display the setting image expressed by the setting image data in the display apparatus, wherein:
      the setting image data is constituted of a plurality of partial data items, the storage section includes a first storage section for storing a part of the plural partial data items, and a second storage section for storing remaining part of the partial data items,
      the first storage section is provided in the information processing apparatus, and the second storage section is provided in an external server.

10. The information processing apparatus as set forth in claim 9, wherein:
    the setting image contains a moving image, the partial data items correspond to frame data items expressing the moving image, and
    the first storage section stores a predetermined number of consecutive frame data items starting from a first frame data item, and the second storage section stores remaining frame data items.

11. The information processing apparatus as set forth in claim 9, wherein:
the setting image is constituted of a plurality of images which are sequentially displayed,
the partial data items correspond to image data items expressing the plurality of images, and
the first storage section stores a predetermined number of consecutively displayed image data items starting from an image data item to be displayed first, and the second storage section stores remaining image data items.

12. A server apparatus capable of communication with an information processing apparatus through a communication network,
the information processing apparatus comprising:
browsing means for obtaining data from a resource and displaying an image expressed by the data in a display apparatus; and
printing control means for controlling a printing operation,
the printing control means including instructing means for instructing the browsing means to obtain setting image data from a storage section which stores the setting image data which corresponds to a setting image for setting printing conditions and to display the setting image expressed by the setting image data in the display apparatus,
the server apparatus comprising determining means which obtains detailed conditions for each of plural printing functions set by the browsing means so as to determine whether or not there is an incompatible combination among the detailed conditions obtained, based on a function restriction table which shows an incompatible combination of the detailed conditions of the printing functions,
the determining means causing the browsing means to display a determination result in the display apparatus.

13. A printing control system comprising a plurality of information processing apparatuses and a server apparatus, which communicate with each other through a communication network,
the information processing apparatus comprising browsing means for obtaining data from a resource and displaying, according to a Web browser, an image expressed by the data in a display apparatus; and printing control means for controlling a printing operation,
the server apparatus storing setting image data which corresponds to a setting image for setting printing conditions,
the printing control means including instructing means for instructing the browsing means to obtain setting image data from a storage section which stores the setting image data which corresponds to a setting image for setting printing conditions and to display the setting image expressed by the setting image data in the display apparatus, wherein
the browsing means sets detailed conditions for each of a plurality of printing functions based on input by a user through the setting image,
the printing control means includes determining means which obtains the detailed conditions for each of the printing functions set by the browsing means so as to determine whether or not there is an incompatible combination among the detailed conditions obtained, based on a function restriction table which shows an incompatible combination of the detailed conditions of the printing functions, and
the browsing means displays a determination result given by the determining means in the display apparatus.

14. A computer-readable storage medium which stores a program for bringing a computer of an information processing apparatus into operation,
the information processing apparatus comprising:
browsing means for obtaining data from a resource and displaying, according to a Web browser, an image expressed by the data in a display apparatus; and
printing control means for controlling a printing operation,
the printing control means including instructing means for instructing the browsing means to obtain setting image data from a storage section which stores the setting image data which corresponds to a setting image for setting printing conditions and to display the setting image expressed by the setting image data in the display apparatus,
the program causing the computer to serve as the printing control means, wherein
the browsing means sets detailed conditions for each of a plurality of printing functions based on input by a user through the setting image,
the printing control means includes determining means which obtains the detailed conditions for each of the printing functions set by the browsing means so as to determine whether or not there is an incompatible combination among the detailed conditions obtained, based on a function restriction table which shows an incompatible combination of the detailed conditions of the printing functions, and
the browsing means displays a determination result given by the determining means in the display apparatus.

15. A computer-readable storage medium which stores a program for bringing a computer of a server apparatus into operation,
the server apparatus capable of communication with an information processing apparatus through a communication network,
the information processing apparatus comprising:
browsing means for obtaining data from a resource and displaying an image expressed by the data in a display apparatus; and
printing control means for controlling a printing operation,
the printing control means including instructing means for instructing the browsing means to obtain setting image data from a storage section which stores the setting image data which corresponds to a setting image for setting printing conditions and to display the setting image expressed by the setting image data in the display apparatus,
the server apparatus comprising determining means which obtains detailed conditions for each of plural printing functions set by the browsing means so as to determine whether or not there is an incompatible combination among the detailed conditions obtained, based on a function restriction table which shows an incompatible combination of the detailed conditions of the printing functions,
the determining means causing the browsing means to display a determination result in the display apparatus,
the program causing the computer to serve as the determining means.

16. A method for controlling an information processing apparatus which performs control of printing operation,
the information processing apparatus comprising:
browsing means for obtaining data from a resource and displaying, according to a Web browser, an image expressed by the data in a display apparatus, the method comprising the step of:
instructing the browsing means to obtain setting image data from a storage section which stores the setting image data which corresponds to a setting image for setting printing conditions and to display the setting image expressed by the setting image data in the display apparatus, wherein
the browsing means sets detailed conditions for each of a plurality of printing functions based on input by a user through the setting image,
the printing control means includes determining means which obtains the detailed conditions for each of the printing functions set by the browsing means so as to determine whether or not there is an incompatible combination among the detailed conditions obtained, based on a function restriction table which shows an incompatible combination of the detailed conditions of the printing functions, and
the browsing means displays a determination result given by the determining means in the display apparatus.

17. A method for controlling a server apparatus capable of communication with an information processing apparatus through a communication network,
the information processing apparatus comprising:
browsing means for obtaining data from a resource and displaying an image expressed by the data in a display apparatus; and
printing control means for controlling a printing operation,
the printing control means including instructing means for instructing the browsing means to obtain setting image data from a storage section which stores the setting image data which corresponds to a setting image for setting printing conditions and to display the setting image expressed by the setting image data in the display apparatus,
the method comprising the steps of:
obtaining detailed conditions for each of plural printing functions set by the browsing means so as to determine whether or not there is an incompatible combination among the detailed conditions obtained, based on a function restriction table which shows an incompatible combination of the detailed conditions of the printing functions; and
causing the browsing means to display a determination result in the display apparatus.

18. A printing control system comprising a plurality of information processing apparatuses and a server apparatus, which communicate with each other through a communication network,
the information processing apparatus comprising browsing means for obtaining data from a resource and displaying, according to a Web browser, an image expressed by the data in a display apparatus; and printing control means for controlling a printing operation,
the server apparatus storing setting image data which corresponds to a setting image for setting printing conditions,
the printing control means including instructing means for instructing the browsing means to obtain setting image data from a storage section which stores the setting image data which corresponds to a setting image for setting printing conditions and to display the setting image expressed by the setting image data in the display apparatus, wherein:
the setting image data is constituted of a plurality of partial data items, the storage section includes a first storage section for storing a part of the plural partial data items, and a second storage section for storing remaining part of the partial data items,
the first storage section is provided in the information processing apparatus, and the second storage section is provided in an external server.

19. A computer-readable storage medium which stores a program for bringing a computer of an information processing apparatus into operation,
the information processing apparatus comprising:
browsing means for obtaining data from a resource and displaying, according to a Web browser, an image expressed by the data in a display apparatus; and
printing control means for controlling a printing operation,
the printing control means including instructing means for instructing the browsing means to obtain setting image data from a storage section which stores the setting image data which corresponds to a setting image for setting printing conditions and to display the setting image expressed by the setting image data in the display apparatus,
the program causing the computer to serve as the printing control means, wherein:
the setting image data is constituted of a plurality of partial data items, the storage section includes a first storage section for storing a part of the plural partial data items, and a second storage section for storing remaining part of the partial data items,
the first storage section is provided in the information processing apparatus, and the second storage section is provided in an external server.

20. A method for controlling an information processing apparatus which performs control of printing operation,
the information processing apparatus comprising:
browsing means for obtaining data from a resource and displaying, according to a Web browser, an image expressed by the data in a display apparatus,
the method comprising the step of:
instructing the browsing means to obtain setting image data from a storage section which stores the setting image data which corresponds to a setting image for setting printing conditions and to display the setting image expressed by the setting image data in the display apparatus, wherein:
the setting image data is constituted of a plurality of partial data items, the storage section includes a first storage section for storing a part of the plural partial data items, and a second storage section for storing remaining part of the partial data items,
the first storage section is provided in the information processing apparatus, and the second storage section is provided in an external server.

* * * * *